United States Patent
Amin et al.

(10) Patent No.: US 12,542,183 B2
(45) Date of Patent: Feb. 3, 2026

(54) MEMORY APPARATUS AND METHOD OF OPERATION USING DYNAMIC MAX PROGRAM LOOP

(71) Applicant: Sandisk Technologies, Inc., Milpitas, CA (US)

(72) Inventors: Parth Amin, Fremont, CA (US); Anubhav Khandelwal, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 545 days.

(21) Appl. No.: 17/343,179

(22) Filed: Jun. 9, 2021

(65) Prior Publication Data

US 2022/0399058 A1    Dec. 15, 2022

(51) Int. Cl.
| | |
|---|---|
| G11C 16/04 | (2006.01) |
| G11C 11/56 | (2006.01) |
| G11C 16/08 | (2006.01) |
| G11C 16/10 | (2006.01) |
| G11C 16/34 | (2006.01) |
| H10B 41/35 | (2023.01) |

(52) U.S. Cl.
CPC .......... *G11C 16/10* (2013.01); *G11C 11/5628* (2013.01); *G11C 16/0483* (2013.01); *G11C 16/08* (2013.01); *G11C 16/3459* (2013.01); *G11C 11/5671* (2013.01); *H10B 41/35* (2023.02)

(58) Field of Classification Search
CPC . G11C 16/10; G11C 11/5628; G11C 16/0483; G11C 16/08; G11C 16/3459; G11C 11/5671; H01L 27/11524

USPC .................................................... 365/185.03
See application file for complete search history.

(56) References Cited

U.S. PATENT DOCUMENTS

| | | | |
|---|---|---|---|
| 5,386,422 A | 1/1995 | Endoh et al. | |
| 5,570,315 A | 10/1996 | Tanaka et al. | |
| 5,774,397 A | 6/1998 | Endoh et al. | |
| 6,046,935 A | 4/2000 | Takeuchi et al. | |
| 6,222,762 B1 | 4/2001 | Guterman et al. | |
| 6,456,528 B1 | 9/2002 | Chen | |
| 6,522,580 B2 | 2/2003 | Chen et al. | |
| 7,023,736 B2 | 4/2006 | Cernea et al. | |
| 7,023,737 B1 | 4/2006 | Wan et al. | |
| 7,046,568 B2 | 5/2006 | Cernea | |
| 7,196,928 B2 | 3/2007 | Chen | |

(Continued)

*Primary Examiner* — Tha-O H Bui
(74) *Attorney, Agent, or Firm* — Dickinson Wright PLLC

(57) ABSTRACT

A memory apparatus and method of operation are provided. The apparatus includes memory cells connected to word lines and arranged in strings and configured to retain a threshold voltage corresponding to memory states. A control circuit is configured to program the memory cells to reach one of a plurality of verify levels each corresponding the memory states using a series of voltage pulses applied to the word lines during a program operation. The control circuit determines an intermediate quantity of the series of voltage pulses necessary for the memory cells associated with a selected one of the memory states to reach the one of the plurality of verify levels corresponding to the selected one of the memory states. The control circuit ends the program operation after a maximum allowable quantity of the series of voltage pulses are utilized. The maximum allowable quantity is selected based on the intermediate quantity.

20 Claims, 17 Drawing Sheets

(56) References Cited

U.S. PATENT DOCUMENTS

| | | | |
|---|---|---|---|
| 7,196,931 B2 | 3/2007 | Cernea et al. | |
| 7,230,854 B2 | 6/2007 | Wan et al. | |
| 7,237,074 B2 | 6/2007 | Guterman et al. | |
| 7,327,619 B2 | 2/2008 | Chan et al. | |
| 8,804,430 B2 | 8/2014 | Lai et al. | |
| 9,460,780 B2 * | 10/2016 | Lee | G11C 16/3459 |
| 9,704,595 B1 * | 7/2017 | Eyal | G11C 16/3431 |
| 9,710,325 B2 * | 7/2017 | Chen | G11C 29/028 |
| 10,090,044 B2 | 10/2018 | Achtenberg et al. | |
| 2006/0140007 A1 | 6/2006 | Cernea et al. | |
| 2012/0250414 A1 * | 10/2012 | Khandelwal | G11C 16/26 |
| | | | 365/185.17 |
| 2018/0150400 A1 * | 5/2018 | Agarwal | G11C 11/5628 |
| 2019/0304549 A1 * | 10/2019 | Yang | G11C 16/30 |

* cited by examiner

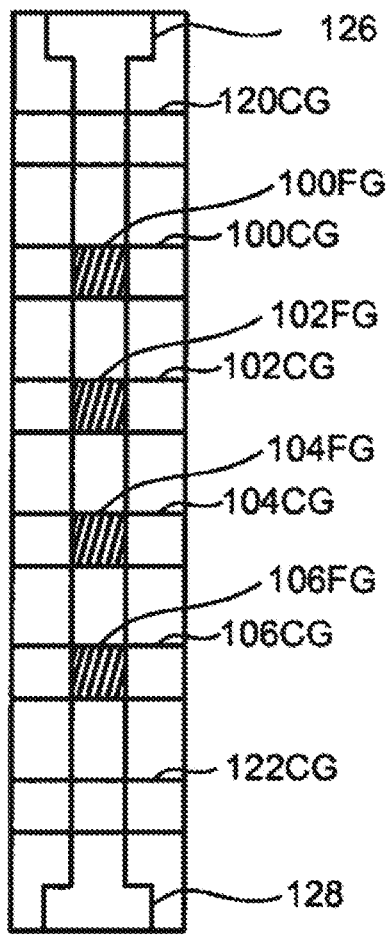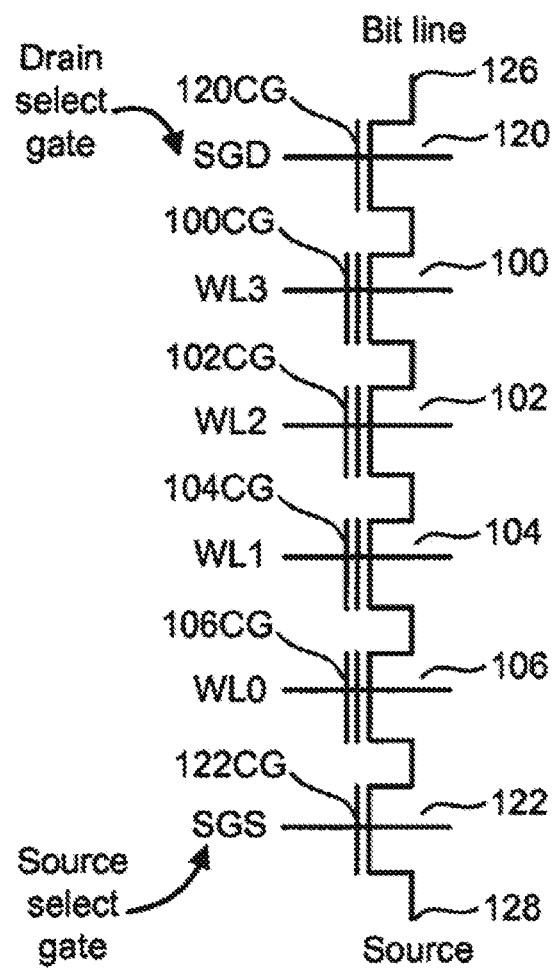
FIG. 1A - Prior Art
FIG. 1B - Prior Art

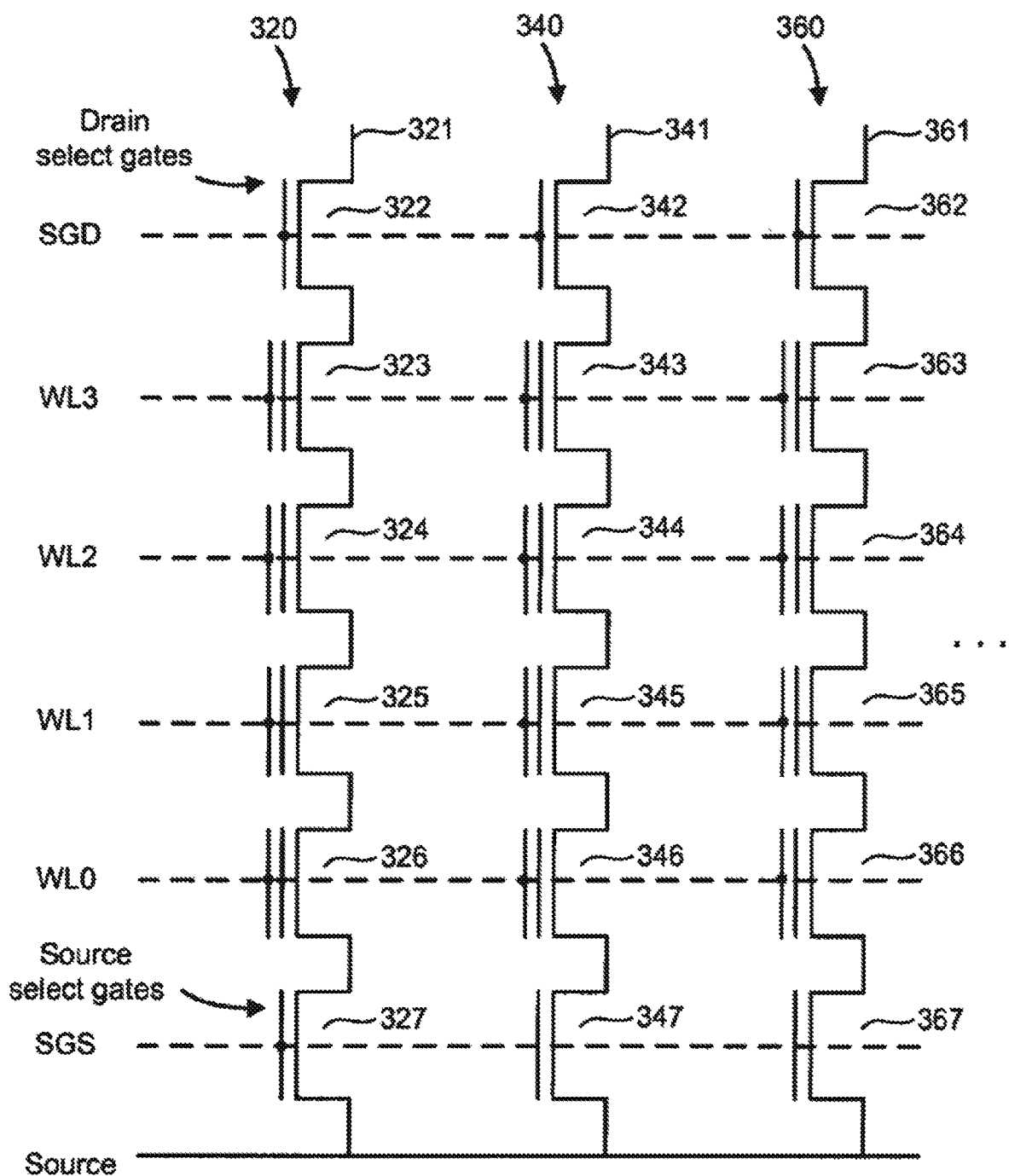
FIG. 2 - Prior Art

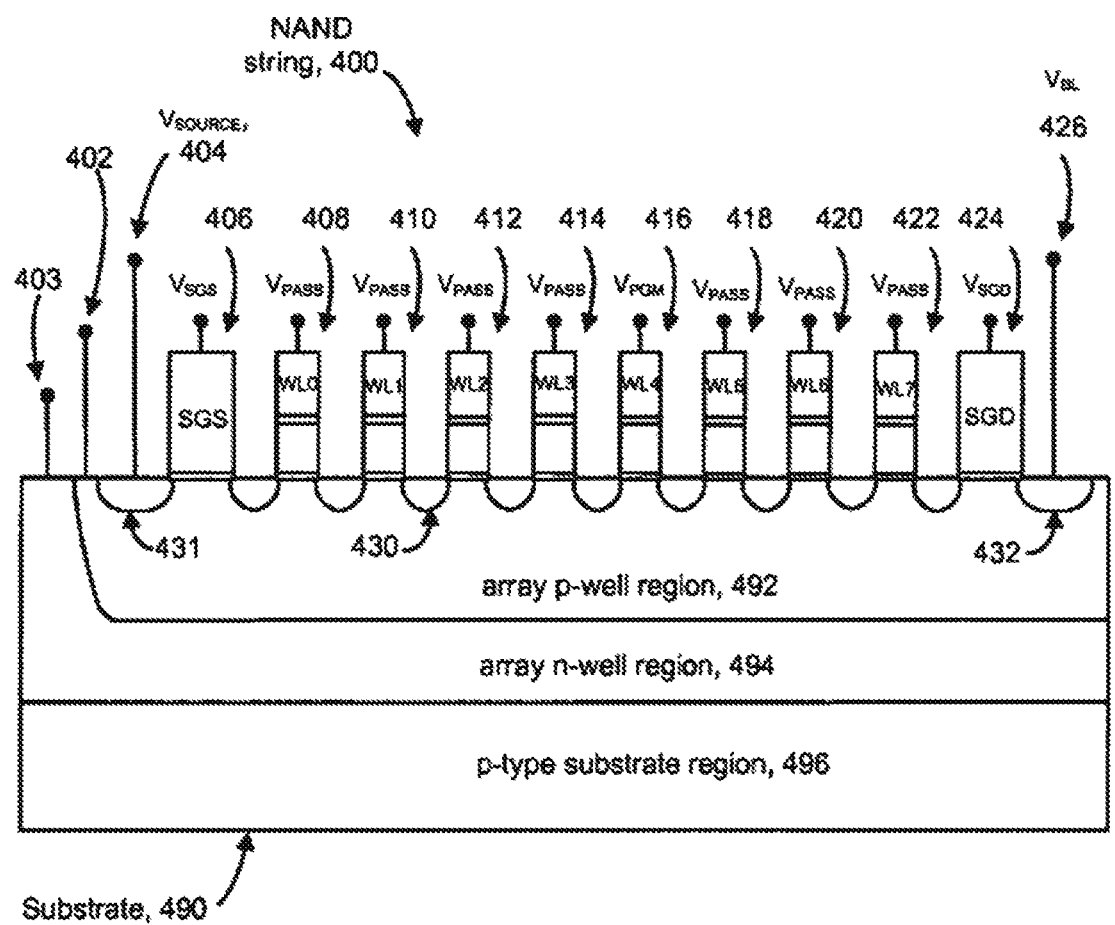
*FIG. 3 - Prior Art*

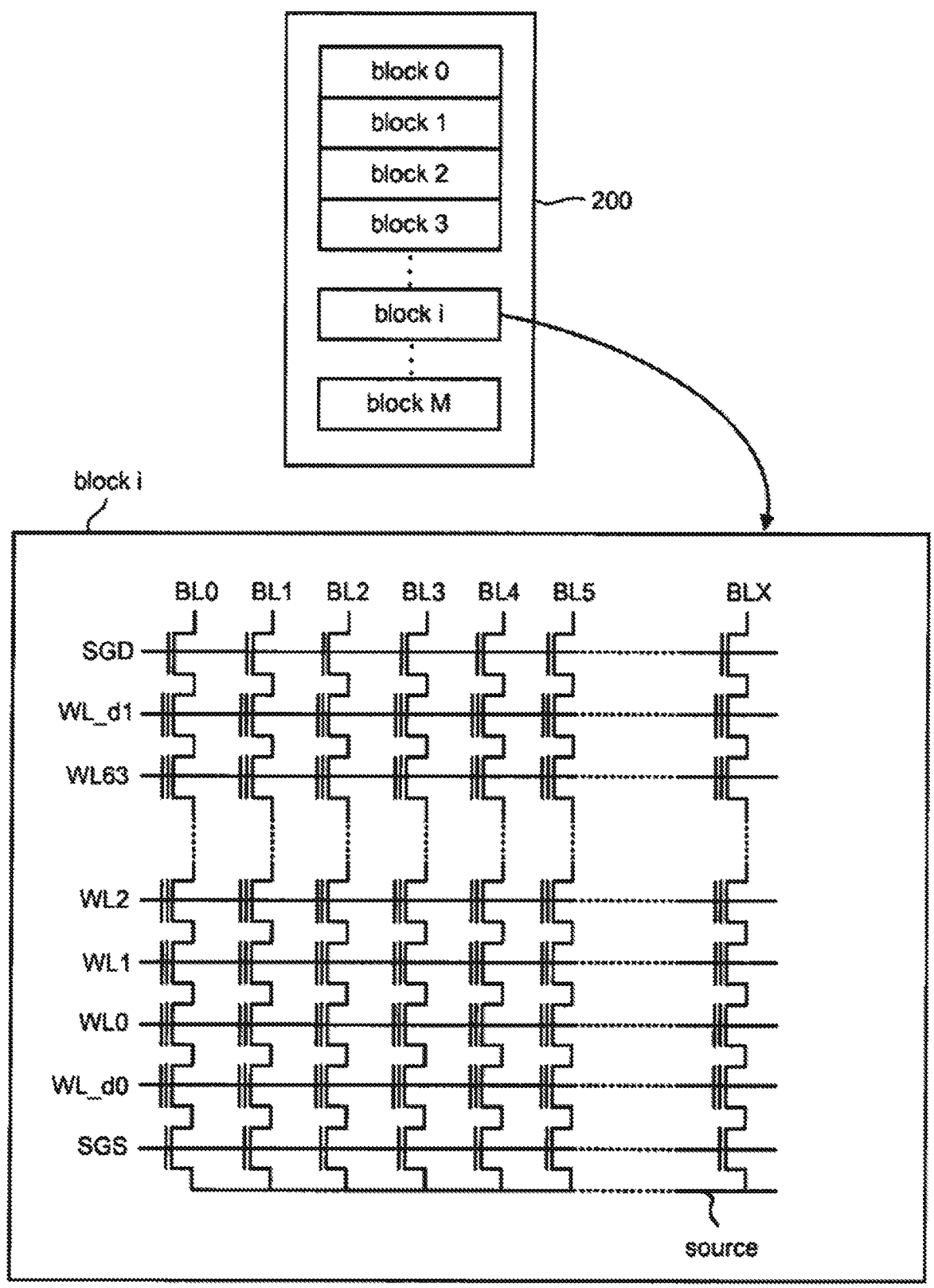
FIG. 5A - Prior Art

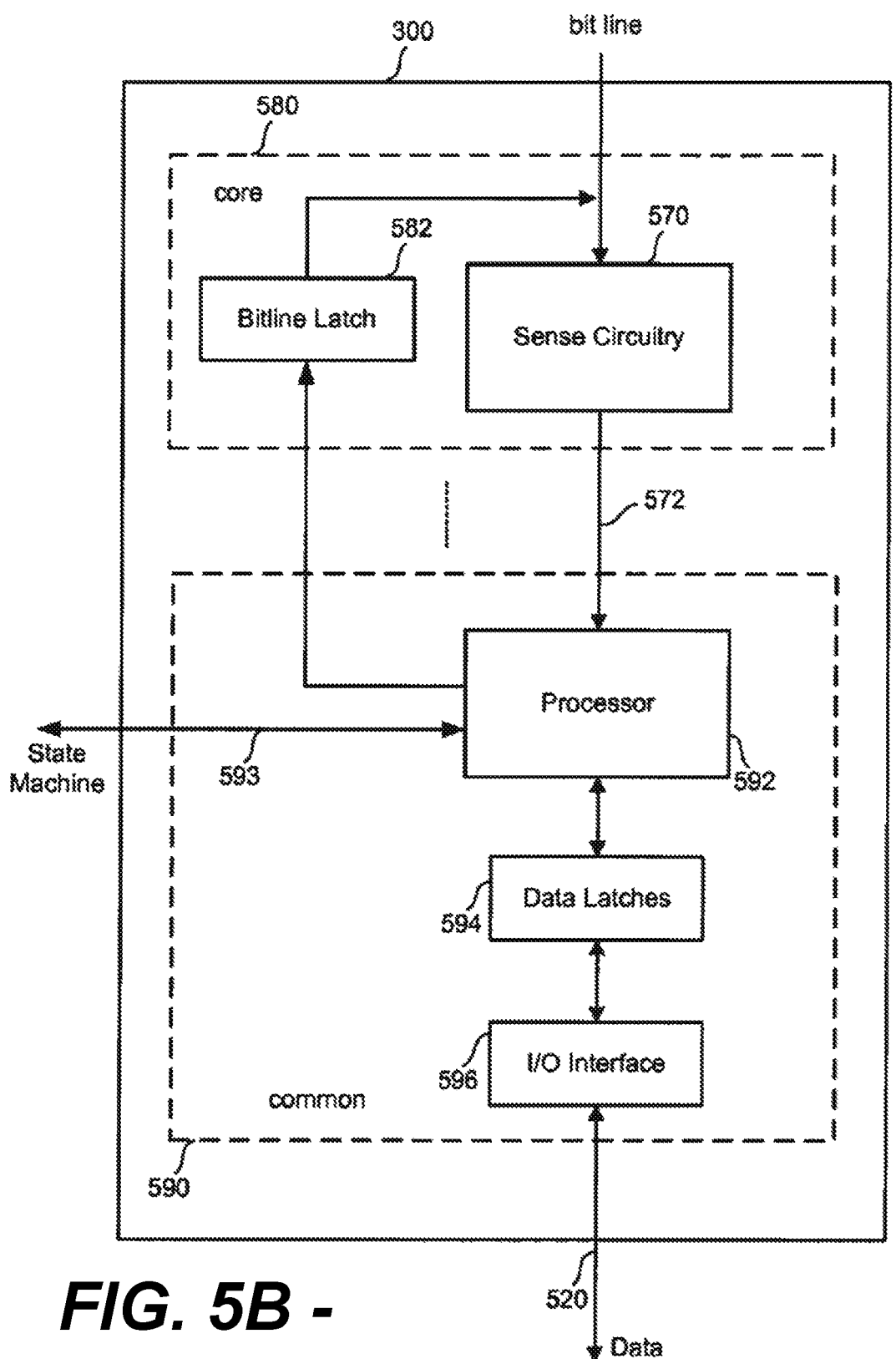
FIG. 5B - Prior Art

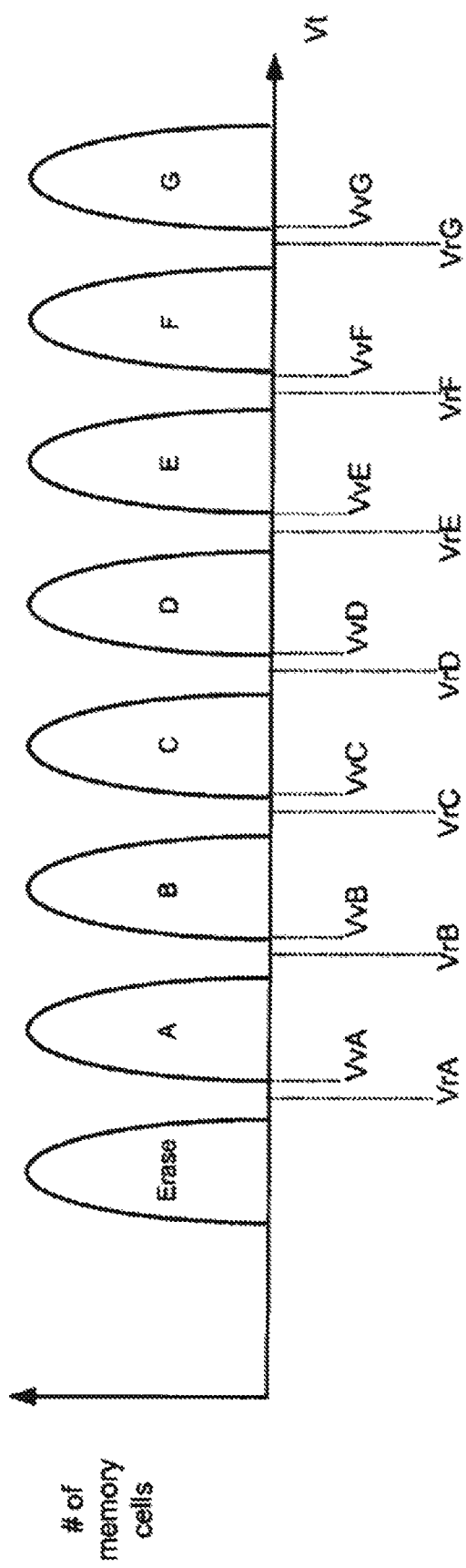
FIG. 6A - Prior Art
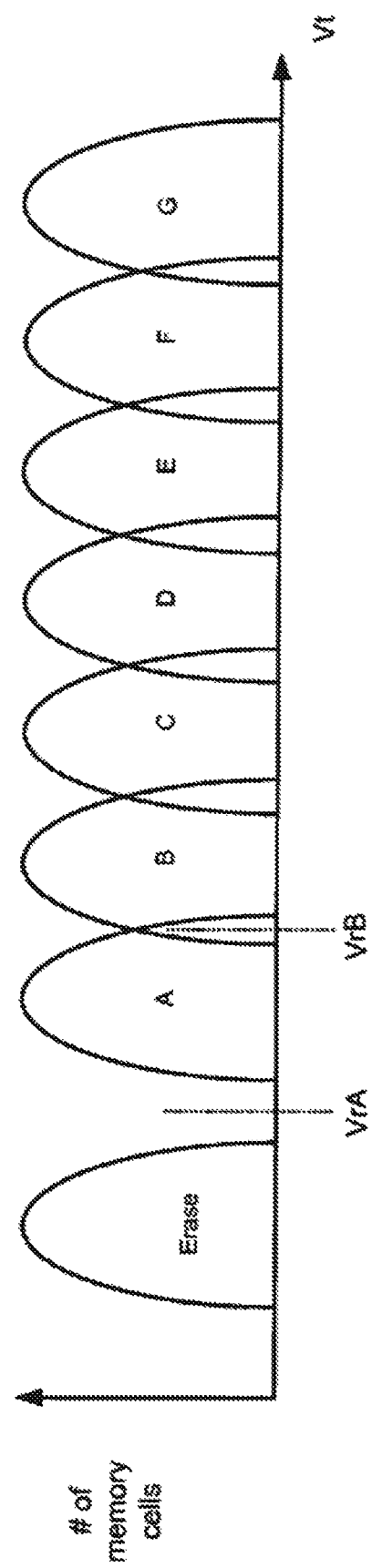
FIG. 6B - Prior Art

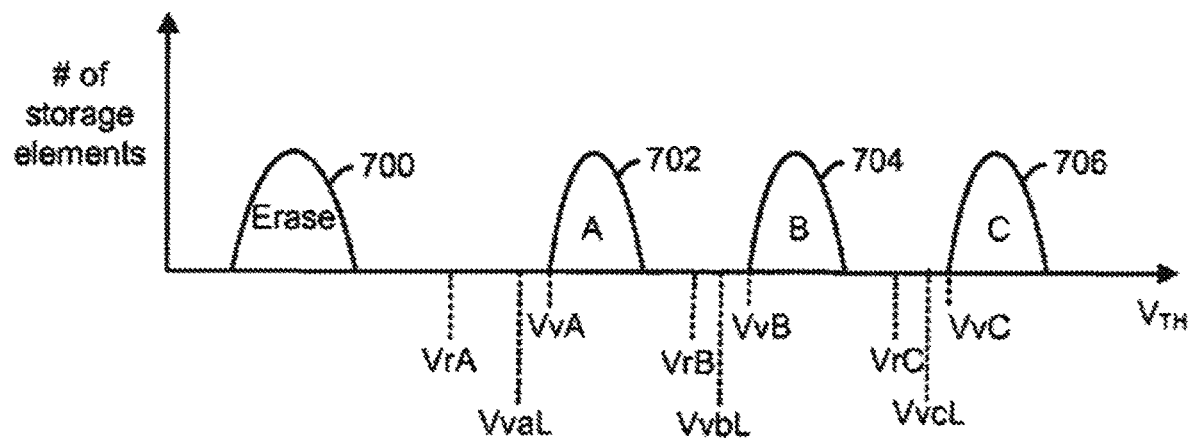
FIG. 7A - Prior Art
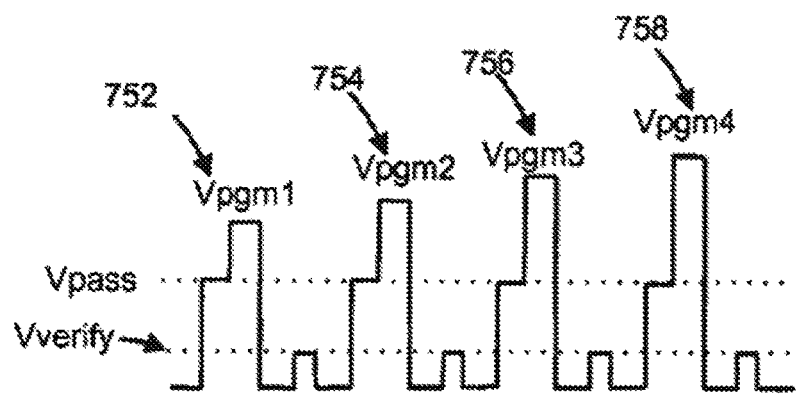
FIG. 7B - Prior Art

FIG. 13

| | 1 | 2 | 3 | 4 | 5 | 6 | 7 | 8 | 9 | 10 | 11 | 12 | 13 | 14 | 15 | 16 | 17 | 18 | MARGIN |
|---|---|---|---|---|---|---|---|---|---|---|---|---|---|---|---|---|---|---|---|
| 10 | | | ▨ | | | | | | | | | | | | | | | | 8 |
| 12 | | | | | ▨ | | | | | | | ▨ | | | | | | | 6 |
| 14 | | | | | | | ▨ | | | | | | | ▨ | | | | | 4 |
| 15 | | | | | | | | ▨ | | | | | | | ▨ | | | | 3 |

▨ NLP_U (FIXED, DEFINED FROM 1ST LOOP)
▨ FINAL_LOOPS
▨ LOOP WHEN A-STATE FINISHES VERIFY

FIG. 14

| | 1 | 2 | 3 | 4 | 5 | 6 | 7 | 8 | 9 | 10 | 11 | 12 | 13 | 14 | 15 | 16 | 17 | 18 | MARGIN |
|---|---|---|---|---|---|---|---|---|---|---|---|---|---|---|---|---|---|---|---|
| 10 | | | ▨ | | | | | | | | | | | | | | | | 3 |
| 12 | | | | | ▨ | | | | | | | | ▨ | | | | | | 3 |
| 14 | | | | | | | ▨ | | | | | | | | ▨ | | | | 3 |
| 15 | | | | | | | | ▨ | | | | | | | | | ▨ | | 3 |

▨ NLP_U (FIXED, DEFINED FROM 1ST LOOP)
▨ FINAL_LOOPS
▨ LOOP WHEN A-STATE FINISHES VERIFY

| FINAL LOOPS | CURRENT NLP_U | MARGIN (NLP_U - FINAL LOOPS) | LOOP WHEN A-STATE FINISH VERIFY | FINAL LOOPS - LOOP WHEN A-STATE FINISH VERIFY |
|---|---|---|---|---|
| 12 | 18 | 6 | 3 OR 4 | 9 OR 8 |
| 13 | 18 | 5 | 4 OR 5 | 9 OR 8 |
| 14 | 18 | 4 | 5 OR 6 | 9 OR 8 |
| 15 | 18 | 3 | 6 OR 7 | 9 OR 8 |

*FIG. 16*

MEMORY APPARATUS AND METHOD OF OPERATION USING DYNAMIC MAX PROGRAM LOOP

FIELD

This application relates to non-volatile memory apparatuses and the operation of non-volatile memory apparatuses.

BACKGROUND

This section provides background information related to the technology associated with the present disclosure and, as such, is not necessarily prior art.

Semiconductor memory has become increasingly popular for use in various electronic devices. For example, non-volatile semiconductor memory is used in cellular telephones, digital cameras, personal digital assistants, mobile computing devices, non-mobile computing devices and other devices. Electrically Erasable Programmable Read Only Memory (EEPROM) and flash memory are among the most popular non-volatile semiconductor memories. With flash memory, also a type of EEPROM, the contents of the whole memory array, or of a portion of the memory, can be erased in one step, in contrast to the traditional, full-featured EEPROM.

Both the traditional EEPROM and the flash memory utilize a floating gate that is positioned above and insulated from a channel region in a semiconductor substrate. The floating gate is positioned between the drain and source diffusion regions. A control gate is provided over and insulated from the floating gate. The threshold voltage ($V_{TH}$) of the transistor thus formed is controlled by the amount of charge that is retained on the floating gate. That is, the minimum amount of voltage that must be applied to the control gate before the transistor is turned on to permit conduction between its drain and source is controlled by the level of charge on the floating gate.

In a NAND architecture, memory cells are arranged as NAND strings. A NAND string includes memory cells (each including a floating gate) connected in series over a substrate. At each end of the NAND string there is a select transistor (also referred to as a select gate). One of the select transistors (source side select transistor) connects/disconnects the NAND string to a source line that is common to a large group of NAND strings. Each NAND string is associated with one bit line. The other select transistor (drain side select transistor) connects/disconnects its NAND string to a bit line. In one approach, a memory cell on a NAND string may be read by applying a voltage to its control gate and sensing a signal on the bit line.

Typically, a program voltage VPGM applied to the control gate during a program operation is applied as a series of pulses that increase in magnitude as programming progresses. In one possible approach, the magnitude of the pulses is increased with each successive pulse by a predetermined step size, e.g., 0.2-0.4 V. VPGM can be applied to the control gates of flash memory cells and a program counter (PC) can be incremented after each successive programming pulse. In the periods between the program pulses, verify operations are carried out. That is, the programming level of each element of a group of cells being programmed in parallel is read between successive programming pulses to determine whether it is equal to or greater than a verify level to which the element is being programmed. Nevertheless, various challenges are presented is selecting the maximum value of the program counter. Thus, there is a need for improved non-volatile memory apparatuses.

SUMMARY

This section provides a general summary of the present disclosure and is not a comprehensive disclosure of its full scope or all of its features and advantages.

An object of the present disclosure is to provide a memory apparatus and a method of operating the memory apparatus that address and overcome the above-noted shortcomings.

Accordingly, it is an aspect of the present disclosure to provide an apparatus including memory cells connected to one of a plurality of word lines and arranged in one or more strings. The memory cells are configured to retain a threshold voltage corresponding to one of a plurality of memory states. A control circuit is coupled to the plurality of word lines and the one or more strings and is configured to program the memory cells to reach one of a plurality of verify levels each corresponding to one of the plurality of memory states using a series of voltage pulses applied to each of the plurality of word lines during a program operation. The control circuit is also configured to determine a first intermediate quantity of the series of voltage pulses necessary for a first plurality of memory cells associated with a selected one of the plurality of memory states to reach the one of the plurality of verify levels corresponding to the selected one of the plurality of memory states. The control circuit is also configured to end the program operation after a maximum allowable quantity of the series of voltage pulses are utilized. The maximum allowable quantity is selected based on the first intermediate quantity.

According to another aspect of the disclosure, a controller in communication with a memory apparatus including memory cells connected to one of a plurality of word lines and arranged in one or more strings and configured to retain a threshold voltage corresponding to one of a plurality of memory states is also provided. The controller is configured to instruct the memory apparatus to program the memory cells to reach one of a plurality of verify levels each corresponding to one of the plurality of memory states using a series of voltage pulses applied to each of the plurality of word lines during a program operation. The controller is also configured to determine a first intermediate quantity of the series of voltage pulses necessary for a first plurality of memory cells associated with a selected one of the plurality of memory states to reach the one of the plurality of verify levels corresponding to the selected one of the plurality of memory states. In addition, the controller is configured to instruct the memory apparatus to end the program operation after a maximum allowable quantity of the series of voltage pulses are utilized. The maximum allowable quantity is selected based on the first intermediate quantity.

According to an additional aspect of the disclosure a method of operating a memory apparatus is provided. The memory apparatus includes memory cells connected to one of a plurality of word lines and arranged in one or more strings and configured to retain a threshold voltage corresponding to one of a plurality of memory states. The method includes the step of programming the memory cells to reach one of a plurality of verify levels each corresponding to one of the plurality of memory states using a series of voltage pulses applied to each of the plurality of word lines during a program operation. The method continues with the step of determining a first intermediate quantity of the series of voltage pulses necessary for a first plurality of memory cells associated with a selected one of the plurality of memory states to reach the one of the plurality of verify levels corresponding to the selected one of the plurality of memory states. The method also includes the step of ending the program operation after a maximum allowable quantity of the series of voltage pulses are utilized. The maximum allowable quantity is selected based on the first intermediate quantity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1A is a top view of a NAND string according to aspects of the disclosure;

FIG. 1B is an equivalent circuit diagram of the NAND string of FIG. 1A according to aspects of the disclosure;

FIG. 2 is a circuit diagram depicting three NAND strings according to aspects of the disclosure;

FIG. 3 depicts a cross-sectional view of a NAND string formed on a substrate according to aspects of the disclosure;

FIG. 5A depicts an exemplary structure of memory cell array according to aspects of the disclosure;

FIG. 5B is a block diagram of an individual sense block according to aspects of the disclosure;

FIG. 6A depicts an example set of Vt distributions according to aspects of the disclosure;

FIG. 6B depicts an example set of Vt distributions according to aspects of the disclosure;

FIG. 7A depicts an example set of threshold voltage distributions for a four-state memory device in which each storage element stores two bits of data according to aspects of the disclosure;

FIG. 7B shows a series of program pulses that may be used to program a distribution of FIG. 7A according to aspects of the disclosure;

FIGS. 13 and 14 show a comparison of a dynamic maximum allowable quantity versus a fixed maximum allowable quantity according to aspects of the disclosure;

Figure 15:
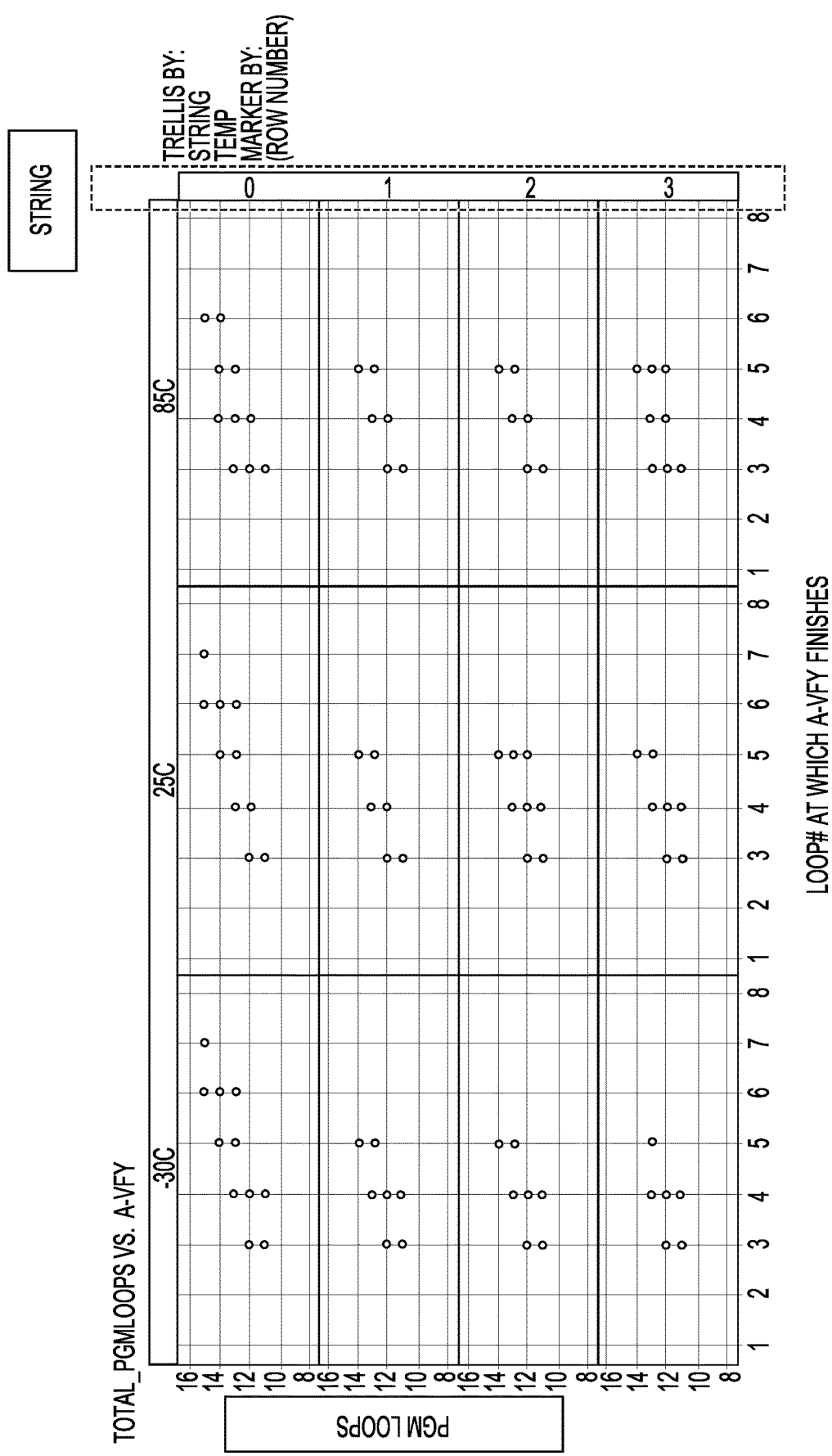
Figure 17:
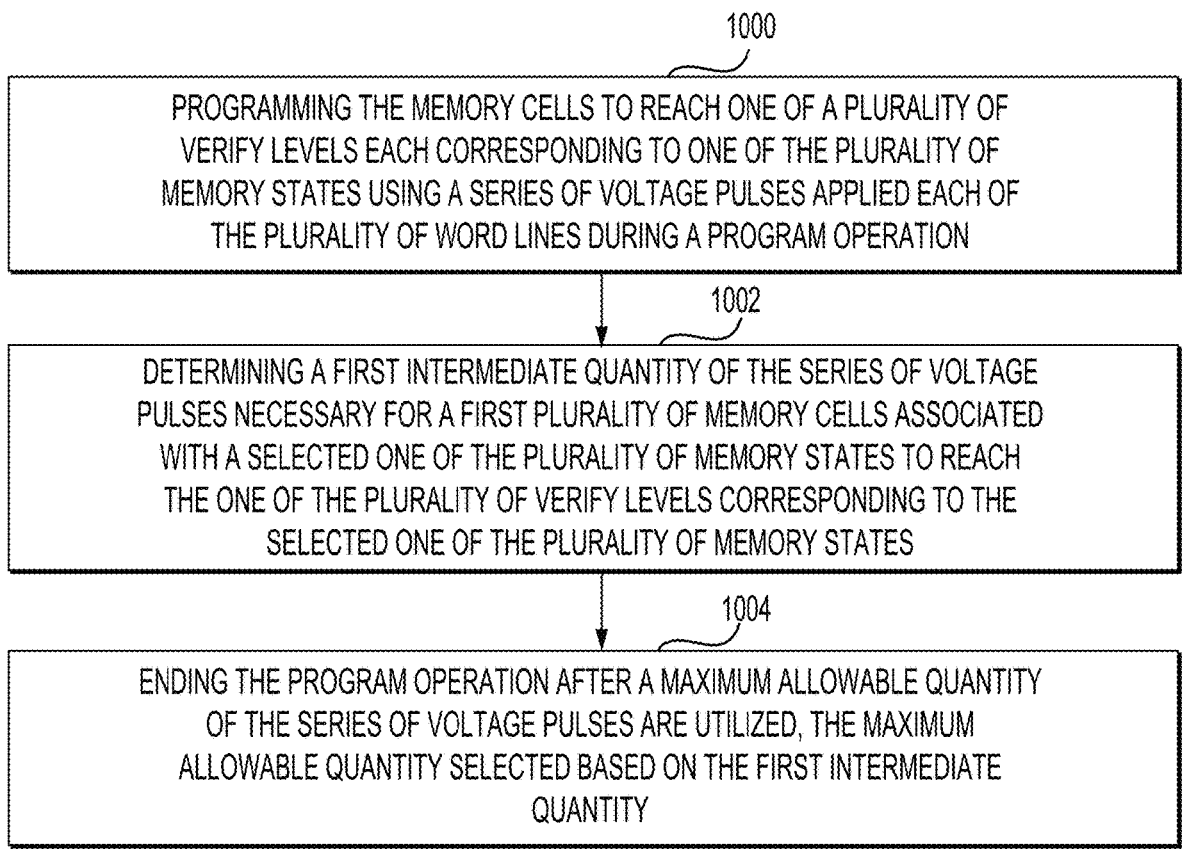

FIG. 15 which shows a quantity or number of final loops being high if a quantity or number of program loops to finish A-verify is high and the quantity or number of final loops being reduced if the quantity or number of program loops to finish A-verify are reduced according to aspects of the disclosure;

FIG. 16 is a table that illustrates that a quantity of program loops needed to finish G-verify from A-verify is predictable according to aspects of the disclosure; and FIG. 17 illustrates steps of a method of operating a memory apparatus according to aspects of the disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following description, details are set forth to provide an understanding of the present disclosure. In some instances, certain circuits, structures and techniques have not been described or shown in detail in order not to obscure the disclosure.

In general, the present disclosure relates to non-volatile memory apparatuses of the type well-suited for use in many applications. The non-volatile memory apparatus and associated methods of operation of this disclosure will be described in conjunction with one or more example embodiments. However, the specific example embodiments disclosed are merely provided to describe the inventive concepts, features, advantages and objectives with sufficient clarity to permit those skilled in this art to understand and practice the disclosure. Specifically, the example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In some memory devices or apparatuses, memory cells are joined to one another such as in NAND strings in a block or sub-block. Each NAND string comprises a number of memory cells connected in series between one or more drain-side SG transistors (SGD transistors), on a drain-side of the NAND string which is connected to a bit line, and one or more source-side SG transistors (SGS transistors), on a source-side of the NAND string which is connected to a source line. Further, the memory cells can be arranged with a common control gate line (e.g., word line) which acts a control gate. A set of word lines extends from the source side of a block to the drain side of a block. Memory cells can be connected in other types of strings and in other ways as well.

In a 3D memory structure, the memory cells may be arranged in vertical strings in a stack, where the stack comprises alternating conductive and dielectric layers. The conductive layers act as word lines which are connected to the memory cells. The memory cells can include data memory cells, which are eligible to store user data, and dummy or non-data memory cells which are ineligible to store user data.

Before programming certain non-volatile memory devices, the memory cells are typically erased. For some devices, the erase operation removes electrons from the floating gate of the memory cell being erased. Alternatively, the erase operation removes electrons from the charge trapping layer.

Each memory cell may be associated with a data state according to write data in a program command. Based on its data state, a memory cell will either remain in the erased state or be programmed to a programmed data state. For example, in a three bit per cell memory device, there are eight data states including the erased state and the programmed state (see e.g., FIG. 6A).

During a program operation, the memory cells are programmed according to a word line programming order. For example, the programming may start at the word line at the source side of the block and proceed to the word line at the drain side of the block. In one approach, each word line is completely programmed before programming a next word line. For example, a first word line, WL0, is programmed using one or more programming pulses until the programming is completed. Next, a second word line, WL1, is programmed using one or more programming pulses until the programming is completed, and so forth. A programming pulse may include a set of increasing program voltages which are applied to the word line in respective program loops or program-verify iterations. Verify operations or stages may be performed after each program voltage to determine whether the memory cells have completed programming. When programming is completed for a memory cell, it can be inhibited from further programming while programming continues for other memory cells in subsequent program loops.

A program counter can be incremented after each program loop. So, once it is determined whether all or almost all of the memory cells have verified that their threshold voltages are at the final target voltage for that memory cell, the programming process is completed successfully. However, if all or almost all of the memory cells are not verified to have reached their final target levels, then it is determined whether the program counter is less than a maximum number of program loops. If the program counter is less than the maximum number of program loops (e.g., 20), then the program counter is incremented by one and the program voltage is stepped up to the next pulse and the next program pulse is applied to the memory cells. If the program counter is not less than the maximum number of program loops, the program operation for the memory cells being programmed is considered to have failed. Such a maximum number of program loops is usually chosen to take into account known factors that may affect programming. Setting the maximum value too tight can result in yield losses while making it too relaxed can result in "Program Disturb" or "PD" effects for short. The PD effect causes cells that are not intended to be written, to unintentionally move from their initial left-most state to some other state. In many instances, the choice of the maximum number of program loops is too conservative. Thus, described herein are memory systems or apparatuses and corresponding methods of operation directed to dynamically and optimally selecting the maximum number of program loops.

One example of a memory system suitable for implementing embodiments uses a NAND flash memory structure, which includes arranging multiple transistors in series between two select gates. The transistors in series and the select gates are referred to as a NAND string. FIG. 1A is a top view showing one NAND string. FIG. 1B is an equivalent circuit thereof. The NAND string depicted in FIGS. 1A and 1B includes four transistors, 100, 102, 104 and 106, in series and sandwiched between a first select gate 120 and a second select gate 122. Select gate 120 gates the NAND string connection to bit line 126. Select gate 122 gates the NAND string connection to source line 128. Select gate 120 is controlled by applying the appropriate voltages to control gate 120CG. Select gate 122 is controlled by applying the appropriate voltages to control gate 122CG. Each of the transistors 100, 102, 104 and 106 has a control gate and a floating gate. Transistor 100 has control gate 100CG and floating gate 100FG. Transistor 102 includes control gate 102CG and floating gate 102FG. Transistor 104 includes control gate 104CG and floating gate 104FG. Transistor 106 includes a control gate 106CG and floating gate 106FG. Control gate 100CG is connected to (or is) word line WL3, control gate 102CG is connected to word line WL2, control gate 104CG is connected to word line WL1, and control gate 106CG is connected to word line WL0. In one embodiment, transistors 100, 102, 104 and 106 are each storage elements, also referred to as memory cells. In other embodiments, the storage elements may include multiple transistors or may be different than that depicted in FIGS. 1A and 1B. Select gate 120 is connected to select line SGD. Select gate 122 is connected to select line SGS. In one embodiment, select gates 120 and 122 are each implemented with a "select transistor." Thus, select gate 120 may be referred to as a "drain side select transistor," (or SGD transistor) and select gate 122 may be referred to as a "source side select transistor" (or SGS transistor).

FIG. 2 is a circuit diagram depicting three NAND strings. A typical architecture for a flash memory system using a NAND structure will include several NAND strings. For example, three NAND strings 320, 340 and 360 are shown in a memory array having many more NAND strings. Each of the NAND strings includes two select gates and four storage elements. While four storage elements are illustrated for simplicity, modern NAND strings can have thirty-two, sixty-four, or more storage elements, for instance.

For example, NAND string 320 includes select gates 322 and 327, and storage elements 323-326, NAND string 340 includes select gates 342 and 347, and storage elements 343-346, NAND string 360 includes select gates 362 and 367, and storage elements 363-366. Each NAND string is connected to the source line by its select gates (e.g., select gates 327, 347 or 367). A selection line SGS is used to control the source side select gates. In one embodiment, the various NAND strings 320, 340 and 360 are connected to respective bit lines 321, 341 and 361, by select transistors. In one embodiment, the select transistors are in the select gates 322, 342, 362, etc. In one embodiment, the select transistors form the select gates 322, 342, 362. These select transistors are controlled by a drain select line SGD. In other embodiments, the select lines do not necessarily need to be in common among the NAND strings; that is, different select lines can be provided for different NAND strings. Word line WL3 is connected to the control gates for storage elements 323, 343 and 363. Word line WL2 is connected to the control gates for storage elements 324, 344 and 364. Word line WL1 is connected to the control gates for storage elements 325, 345 and 365. Word line WL0 is connected to the control gates for storage elements 326, 346 and 366. As can be seen, each bit line and the respective NAND string comprise the columns of the array or set of storage elements. The word lines (WL3, WL2, WL1 and WL0) comprise the rows of the array or set. Each word line connects the control gates of each storage element in the row. Or, the control gates may be provided by the word lines themselves. For example, word line WL2 provides the control gates for storage elements 324, 344 and 364. In practice, there can be thousands of storage elements on a word line.

Each storage element can store data. For example, when storing one bit of digital data, the range of possible threshold voltages ($V_{TH}$) of the storage element is divided into two ranges which are assigned logical data "1" and "0." In one example of a NAND type flash memory, the $V_{TH}$ is negative after the storage element is erased, and defined as logic "1." The $V_{TH}$ after a program operation is positive and defined as logic "0." When the $V_{TH}$ is negative and a read is attempted, the storage element will turn on to indicate logic "1" is being stored. When the $V_{TH}$ is positive and a read operation is attempted, the storage element will not turn on, which indicates that logic "0" is stored. A storage element can also store multiple levels of information, for example, multiple bits of digital data. In this case, the range of $V_{TH}$ value is divided into the number of levels of data. For example, if four levels of information are stored, there will be four $V_{TH}$ ranges assigned to the data values "11", "10", "01", and "00." In one example of a NAND type memory, the $V_{TH}$ after an erase operation is negative and defined as "11". Positive $V_{TH}$ values are used for the states of "10", "01", and "00." The specific relationship between the data programmed into the storage element and the threshold voltage ranges of the element depends upon the data encoding scheme adopted for the storage elements. For example, U.S. Pat. Nos. 6,222,762 and 7,237,074, both of which are incorporated herein by reference in their entirety, describe various data encoding schemes for multi-state flash storage elements.

Relevant examples of NAND type flash memories and their operation are provided in U.S. Pat. Nos. 5,386,422; 5,570,315; 5,774,397; 6,046,935; 6,456,528; and 6,522,580, each of which is incorporated herein by reference.

When programming a flash storage element, a program voltage is applied to the control gate of the storage element, and the bit line associated with the storage element is grounded. Electrons from the channel are injected into the floating gate. When electrons accumulate in the floating gate, the floating gate becomes negatively charged and the $V_{TH}$ of the storage element is raised. To apply the program voltage to the control gate of the storage element being programmed, that program voltage is applied on the appropriate word line. As discussed above, one storage element in each of the NAND strings share the same word line. For example, when programming storage element 324 of FIG. 2, the program voltage will also be applied to the control gates of storage elements 344 and 364.

FIG. 3 depicts a cross-sectional view of a NAND string formed on a substrate. The view is simplified and not to scale. The NAND string 400 includes a source-side select gate (or SGS transistor) 406, a drain-side select gate (or SGD transistor) 424, and eight storage elements 408, 410, 412, 414, 416, 418, 420 and 422, formed on a substrate 490. A number of source/drain regions, one example of which is source drain/region 430, are provided on either side of each storage element. In one embodiment, the substrate 490 employs a triple-well technology which includes an array p-well region 492 within an array n-well region 494, which in turn is within a p-type substrate region 496. The NAND string and its non-volatile storage elements can be formed, at least in part, on the array p-well region 492.

A voltage $V_{SOURCE}$ is provided to a source line contact 404. The source line contact has an electrical connection to the diffusion region 431 of SGS transistor 406. A bit line voltage $V_{BL}$ is supplied to bit line contact 426, which is in electrical contact with the diffusion region 432 of SGD transistor 424. Note that diffusion region 431 may be referred to herein as a source. Note that diffusion region 432 may be referred to herein as a drain; however, it will be understood that under some conditions (such as when the voltage of the channel of the NAND string is boosted) the diffusion region 432 may be at a lower voltage than the terminal on the other side of the channel of the SGD transistor 424. Voltages, such as body bias voltages, can also be applied to the array p-well region 492 via a terminal 402 and/or to the array n-well region 494 via a terminal 403.

During a program operation, a control gate voltage VPGM is provided on a selected word line, in this example, WL3, which is associated with storage element 414. Further, recall that the control gate of a storage element may be provided as a portion of the word line. For example, WL0, WL1, WL2, WL3, WL4, WL5, WL6 and WL7 can extend via the control gates of storage elements 408, 410, 412, 414, 416, 418, 420 and 422, respectively. A pass voltage, VPASS is applied to the remaining word lines associated with NAND string 400, in one possible boosting scheme. $V_{SGS}$ and $V_{SGD}$ are applied to the select gates 406 and 424, respectively.

Figure 4:
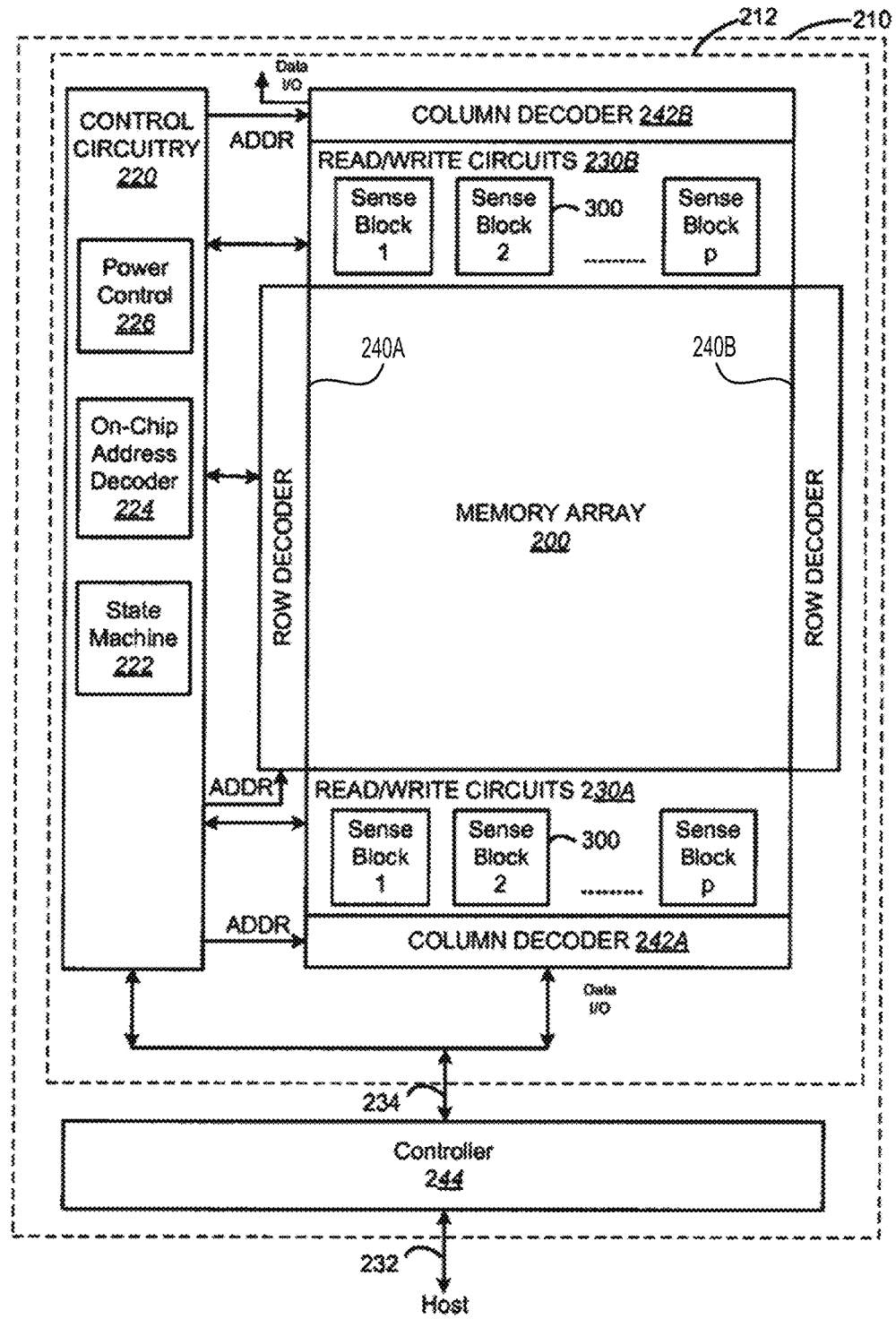
FIG. 4 illustrates a non-volatile storage device according to aspects of the disclosure.

FIG. 4 illustrates a non-volatile storage device 210 that may include one or more memory die or chips 212. Memory die 212 includes an array (two-dimensional or three dimensional) of memory cells 200, control circuitry 220, and read/write circuits 230A and 230B. In one embodiment, access to the memory array 200 by the various peripheral circuits is implemented in a symmetric fashion, on opposite sides of the array, so that the densities of access lines and circuitry on each side are reduced by half. The read/write circuits 230A and 230B include multiple sense blocks 300 which allow a page of memory cells to be read or programmed in parallel. The memory array 200 is addressable by word lines via row decoders 240A and 240B and by bit lines via column decoders 242A and 242B. In a typical embodiment, a controller 244 is included in the same memory device 210 (e.g., a removable storage card or package) as the one or more memory die 212. Commands and data are transferred between the host and controller 244 via lines 232 and between the controller and the one or more memory die 212 via lines 234. One implementation can include multiple chips 212.

Control circuitry 220 cooperates with the read/write circuits 230A and 230B to perform memory operations on the memory array 200. The control circuitry 220 includes a state machine 222, an on-chip address decoder 224 and a power control module 226. The state machine 222 provides chip-level control of memory operations. The on-chip address decoder 224 provides an address interface to convert between the address that is used by the host or a memory controller to the hardware address used by the decoders 240A, 240B, 242A, and 242B. The power control module 226 controls the power and voltages supplied to the word lines and bit lines during memory operations. In one embodiment, power control module 226 includes one or more charge pumps that can create voltages larger than the supply voltage.

In one embodiment, one or any combination of control circuitry 220, power control circuit 226, decoder circuit 224, state machine circuit 222, decoder circuit 242A, decoder circuit 242B, decoder circuit 240A, decoder circuit 240B, read/write circuits 230A, read/write circuits 230B, and/or controller 244 can be referred to as one or more managing circuits.

FIG. 5A depicts an example structure of memory cell array 200. In one embodiment, the array of memory cells is divided into M blocks of memory cells. As is common for flash EEPROM systems, the block is the unit of erase. That is, each block contains the minimum number of memory cells that are erased together. Each block is typically divided into a number of pages. A page is a unit of programming. One or more pages of data are typically stored in one row of memory cells. A page can store one or more sectors. A sector includes user data and overhead data. Overhead data typically includes an Error Correction Code (ECC) that has been calculated from the user data of the sector. A portion of the controller (described below) calculates the ECC when data is being programmed into the array, and also checks it when data is being read from the array. In one embodiment, the controller 244 is able to correct a certain number of misreads, based on the ECC.

Alternatively, the ECCs and/or other overhead data are stored in different pages, or even different blocks, than the user data to which they pertain. A sector of user data is typically 512 bytes, corresponding to the size of a sector in magnetic disk drives. A large number of pages form a block, anywhere from 8 pages, for example, up to 32, 64, 128 or more pages. Different sized blocks and arrangements can also be used.

In another embodiment, the bit lines are divided into odd bit lines and even bit lines. In an odd/even bit line architecture, memory cells along a common word line and connected to the odd bit lines are programmed at one time, while memory cells along a common word line and connected to even bit lines are programmed at another time.

FIG. 5A shows more details of block i of memory array 200. Block i includes X+1 bit lines and X+1 NAND strings. Block i also includes 64 data word lines (WL0-WL63), 2 dummy word lines (WL_d0 and WL_d1), a drain side select line (SGD) and a source side select line (SGS). One terminal of each NAND string is connected to a corresponding bit line via a drain select gate (connected to select line SGD), and another terminal is connected to the source line via a source select gate (connected to select line SGS). Because there are sixty four data word lines and two dummy word lines, each NAND string includes sixty four data memory cells and two dummy memory cells. In other embodiments, the NAND strings can have more or fewer than 64 data memory cells and two dummy memory cells. Data memory cells can store user or system data. Dummy memory cells are typically not used to store user or system data. Some embodiments do not include dummy memory cells.

FIG. 5B is a block diagram of an individual sense block 300 partitioned into a core portion, referred to as a sense module 580, and a common portion 590. In one embodiment, there will be a separate sense module 580 for each bit line and one common portion 590 for a set of multiple sense modules 580. In one example, a sense block will include one common portion 590 and eight sense modules 580. Each of the sense modules in a group will communicate with the associated common portion via a data bus 572. For further details, refer to U.S. Patent Application Publication 2006/0140007, which is incorporated herein by reference in its entirety.

Sense module 580 comprises sense circuitry 570 that determines whether a conduction current in a connected bit line is above or below a predetermined threshold level. In some embodiments, sense module 580 includes a circuit commonly referred to as a sense amplifier. Sense module 580 also includes a bit line latch 582 that is used to set a voltage condition on the connected bit line. For example, a predetermined state latched in bit line latch 582 will result in the connected bit line being pulled to a state designating program inhibit (e.g., $V_{DD}$).

Common portion 590 comprises a processor 592, a set of data latches 594 and an I/O Interface 596 coupled between the set of data latches 594 and data bus 520. Processor 592 performs computations. For example, one of its functions is to determine the data stored in the sensed memory cell and store the determined data in the set of data latches. The set of data latches 594 is used to store data bits determined by processor 592 during a read operation. Data latches 594 may also be used to store data bits imported from the data bus 520 during a program operation. The imported data bits represent write data meant to be programmed into the memory. I/O interface 596 provides an interface between data latches 594 and the data bus 520.

During read or sensing, the operation of the system is under the control of state machine 222 that controls the supply of different control gate voltages to the addressed cell. As it steps through the various predefined control gate voltages corresponding to the various memory states supported by the memory, the sense module 580 may trip at one of these voltages and an output will be provided from sense module 580 to processor 592 via bus 572. At that point, processor 592 determines the resultant memory state by consideration of the tripping event(s) of the sense module and the information about the applied control gate voltage from the state machine via input lines 593. It then computes a binary encoding for the memory state and stores the resultant data bits into data latches 594. In another embodiment of the core portion, bit line latch 582 serves double duty, both as a latch for latching the output of the sense module 580 and also as a bit line latch as described above.

It is anticipated that some implementations will include multiple processors 592. In one embodiment, each processor 592 will include an output line (not depicted in FIG. 5) such that each of the output lines is wired-OR'd together. In some embodiments, the output lines are inverted prior to being connected to the wired-OR line. This configuration enables a quick determination during the program verification process of when the programming process has completed because the state machine receiving the wired-OR line can determine when all bits being programmed have reached the desired level. For example, when each bit has reached its desired level, a logic zero for that bit will be sent to the wired-OR line (or a data one is inverted). When all bits output a data 0 (or a data one inverted), then the state machine knows to terminate the programming process. In embodiments where each processor communicates with eight sense modules, the state machine may (in some embodiments) need to read the wired-OR line eight times, or logic is added to processor 592 to accumulate the results of the associated bit lines such that the state machine need only read the wired-OR line one time.

During program or verify, the data to be programmed is stored in the set of data latches 594 from the data bus 520. The program operation, under the control of the state machine, comprises a series of programming voltage pulses (with increasing magnitudes) applied to the control gates of the addressed memory cells. Each programming pulse is followed by a verify process to determine if the memory cell has been programmed to the desired state. Processor 592 monitors the verified memory state relative to the desired memory state. When the two are in agreement, processor 592 sets the bit line latch 582 so as to cause the bit line to be pulled to a state designating program inhibit. This inhibits the cell coupled to the bit line from further programming even if it is subjected to programming pulses on its control gate. In other embodiments the processor initially loads the bit line latch 582 and the sense circuitry sets it to an inhibit value during the verify process. In one embodiment, the magnitude of the inhibit value depends on the location of the selected word line.

Data latch stack 594 contains a stack of data latches corresponding to the sense module. In one embodiment, there are 3-5 (or another number) data latches per sense module 580. In one embodiment, the latches are each one bit. In some implementations (but not required), the data latches are implemented as a shift register so that the parallel data stored therein is converted to serial data for data bus 520, and vice versa. In one embodiment, all the data latches corresponding to the read/write block of M memory cells can be linked together to form a block shift register so that a block of data can be input or output by serial transfer. In particular, the bank of read/write modules is adapted so that each of its set of data latches will shift data in to or out of the data bus in sequence as if they are part of a shift register for the entire read/write block.

Additional information about the read operations and sense amplifiers can be found in (1) U.S. Pat. No. 7,196,931, "Non-Volatile Memory And Method With Reduced Source Line Bias Errors,"; (2) U.S. Pat. No. 7,023,736, "Non-Volatile Memory And Method with Improved Sensing,"; (3) U.S. Pat. No. 7,046,568, "Memory Sensing Circuit and Method for Low Voltage Operation; (4) U.S. Pat. No. 7,196,928, "Compensating for Coupling During Read Operations of Non-Volatile Memory," and (5) U.S. Pat. No. 7,327,619, "Reference Sense Amplifier For Non-Volatile Memory". All five of the immediately above-listed patent documents are incorporated herein by reference in their entirety.

At the end of a successful programming process (with verification), the threshold voltages of the memory cells should be within one or more distributions of threshold voltages for programmed memory cells or within a distribution of threshold voltages for erased memory cells, as appropriate. FIG. 6A illustrates example Vt distributions corresponding to data states for the memory cell array when each memory cell stores three bits of data. Other embodiment, however, may use more or fewer than three bits of data per memory cell. FIG. 6A shows eight Vt distributions corresponding to an Erase state and programmed states A-G. In one embodiment, the threshold voltages in the Erase state are negative and the threshold voltages in the programmed states A-G are positive.

However, the threshold voltages in one or more of programmed states A-G may be negative. Thus, in one embodiment, at least VrA is negative. Other voltages such as VvA, VrB, VvB, etc., may also be negative.

Between each of the data states are read reference voltages used for reading data from memory cells. For example, FIG. 6A shows read reference voltage VrA between the erase state and the A-state, and VrB between the A-state and B-state. By testing whether the threshold voltage of a given memory cell is above or below the respective read reference voltages, the system can determine what state the memory cell is in.

At or near the lower edge of each programmed state are verify reference voltages. For example, FIG. 6A shows VvA for the A-state and VvB for the B-state. When programming memory cells to a given state, the system will test whether those memory cells have a threshold voltage greater than or equal to the verify reference voltage.

FIG. 6B illustrates that Vt distributions can partially overlap since the error correction algorithm can handle a certain percentage of cells that are in error. Note that in some embodiments, at one point in time the threshold voltage distribution may resemble FIG. 6A and at another time the threshold voltage distributions may overlap, as in FIG. 6B. For example, just after programming, the threshold voltage distribution may resemble FIG. 6A. However, over time, the threshold voltages of memory cells may shift, such that there may be overlap.

Also note that contrary to the equal spacing/width of the depicted threshold voltage distributions, various distributions may have different widths/spacings in order to accommodate varying amounts of susceptibility to data retention loss.

In some embodiments, a "verify low" and a "verify high" reference voltage is used. FIG. 7A depicts an example set of threshold voltage distributions for a four-state memory device in which each storage element stores two bits of data. A first threshold voltage distribution 700 is provided for erased (Erased-state) storage elements. Three threshold voltage distributions 702, 704 and 706 represent programmed states A, B and C, respectively. In one embodiment, the threshold voltages in the Erased-state are negative, and the threshold voltages in the A-, B- and C-states are positive.

Read reference voltages, VrA, VrB and VrC, are also provided for reading data from storage elements. By testing whether the threshold voltage of a given storage element is above or below VrA, VrB and VrC, the system can determine the state, e.g., the storage element is in.

Further, verify reference voltages, VvA, VvB, and VvC are provided. When programming storage elements to the A-state, B-state or C-state, the system will test whether those storage elements have a threshold voltage greater than or equal to VvA, VvB or VvC, respectively. In one embodiment, "verify low" reference voltages, VvaL, VvbL, and VvcL are provided. Similar "verify low" reference voltages could also be used in embodiments with a different number of states.

In full sequence programming, storage elements can be programmed from the Erased-state directly to any of the programmed states A, B or C. For example, a population of storage elements to be programmed may first be erased so that all storage elements in the population are in the Erased-state. A series of program pulses such as depicted in FIG. 7B is used to program storage elements directly into the A-, B- and C-states. While some storage elements are being programmed from the Erased-state to the A-state, other storage elements are being programmed from the Erased-state to the B-state and/or from the Erased-state to the C-state. Note that using a full sequence programming is not required.

One example of a slow programming mode uses low (offset) and high (target) verify levels for one or more data states. For example, VvaL and VvA are offset and target verify levels, respectively, for the A-state, and VvbL and VvB are offset and target verify levels, respectively, for the B-state. During programming, when the threshold voltage of a storage element which is being programmed to the A-state as a target state (e.g., an A-state storage element) exceeds VvaL, its programming speed is slowed, such as by raising the bit line voltage to a level, e.g., 0.6-0.8 V, which is between a nominal program or non-inhibit level, e.g., 0 V and a full inhibit level, e.g., 2-3 V. The middle value may be referred to as a quick pass write (QPW) value. This provides greater accuracy by avoiding large step increases in threshold voltage. In some embodiments, values for one or more of the nominal program value, QPW value, and/or the inhibit value depend on the location of the word line that is selected for programming.

When the threshold voltage reaches VvA, the storage element is locked out from further programming. Similarly, when the threshold voltage of a B-state storage element exceeds VvbL, its programming speed is slowed, and when the threshold voltage reaches VvB, the storage element is locked out from further programming. In one approach, a slow programming mode is not used for the highest state since some overshoot is typically acceptable. Instead, the slow programming mode can be used for the programmed states, above the erased state, and below the highest state.

Moreover, in the example programming techniques discussed, the threshold voltage of a storage element is raised as it is programmed to a target data state. However, programming techniques can be used in which the threshold voltage of a storage element is lowered as it is programmed to a target data state. Programming techniques which measure storage element current can be used as well. The concepts herein can be adapted to different programming techniques.

FIG. 7B depicts a series of program and verify pulses which are applied to a selected word line during a programming operation. A programming operation may include multiple programming iterations, where each iteration applies one or more program pulses (voltages) followed by one or more verify voltages, to a selected word line. In one possible approach, the program voltages are stepped up in successive iterations. Moreover, the program voltages may include a first portion which has a pass voltage (Vpass) level, e.g., 6-8 V, followed by a second portion at a program level, e.g., 12-25 V. For example, first, second, third and fourth program pulses 752, 754, 756 and 758 have program voltages of Vpgm1, Vpgm2, Vpgm3 and Vpgm4, respectively, and so forth. A set of one or more verify voltages may be provided after each program pulse. In some embodiments, there may be two or more verify pulses between the program pulses. For example, one pulse might be used to verify the A-state and the B-state, a second may be used to verify the C-state and a D-state, etc. In some cases, one or more initial program pulses are not followed by verify pulses because it is not expected that any storage elements have reached the lowest program state (e.g., A-state). Subsequently, program iterations may use verify pulses for the A-state, followed by program iterations which use verify pulses for the A- and B-states, followed by program iterations which use verify pulses for the B- and C-states, for instance.

Figure 8:
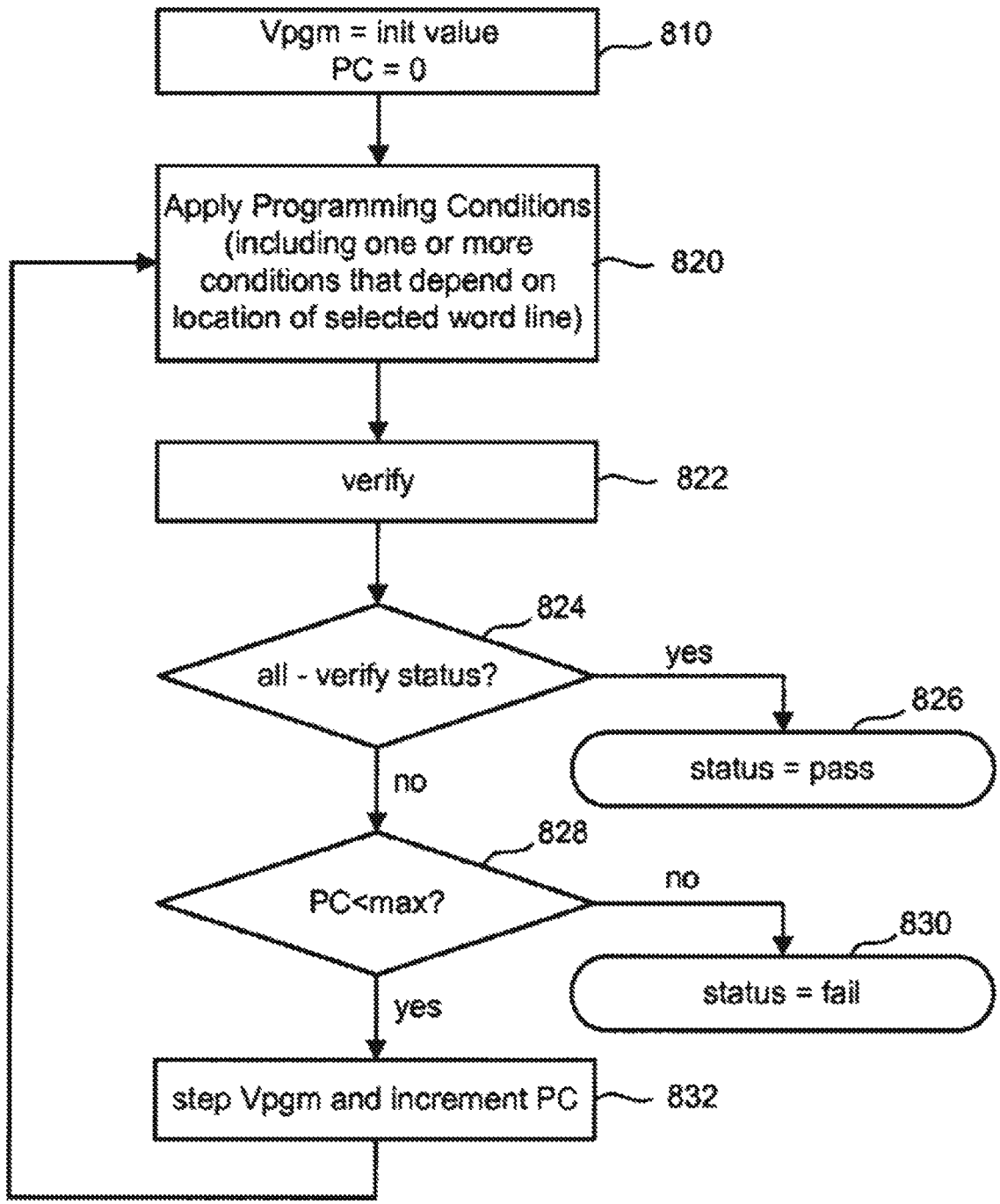
FIG. 8 is a flowchart describing one embodiment of a programming process according to aspects of the disclosure.

FIG. 8 is a flowchart describing one embodiment of a programming process, which includes one or more verification steps. In one embodiment, the process is used to program memory cells on a selected word line. In one embodiment, the process is used to program every memory cell on the selected word line. In one embodiment, the process is used to program every other memory cell (e.g., odd/even programming) on the selected word line.

In step 810, the program voltage (Vpgm) is set to an initial value. In one embodiment, the magnitude of the program voltage depends on which word line is selected for programming. In one embodiment, the initial magnitude of Vpgm is lower when programming an edge word line. Also, in step 810, a program counter (PC) is initialized to zero.

Figure 9:
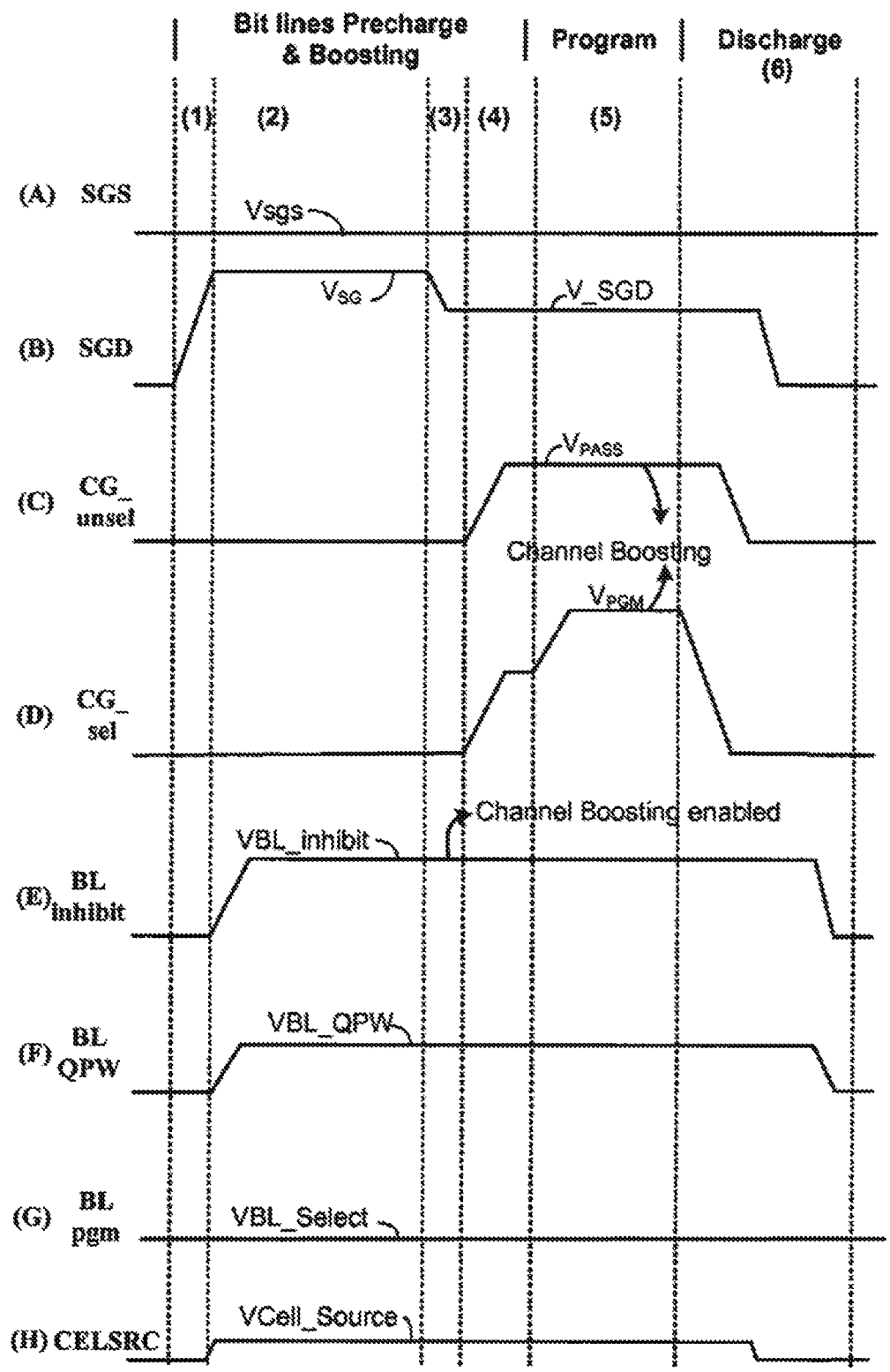
FIG. 9 is a timing diagram illustrating voltages during program operations according to aspects of the disclosure.

In step 820, programming conditions are applied. One or more of the programming conditions may depend on the location of which word line is selected for programming. FIG. 9, to be discussed below, shows some examples of programming conditions that may be applied during step 820.

Applying the programming conditions includes applying a programming signal (e.g., voltage pulse) to a selected word line. In one embodiment, the width of the voltage pulse depends on the location of the selected word line on the NAND string. In one embodiment, the voltage pulse has a shorter width when an edge word line is selected for programming than when one of the middle word lines is selected.

Step 820 may also include applying an appropriate voltage to bit lines. In one embodiment, a first voltage (e.g., a low voltage) is applied to bit lines associated with NAND strings having a memory cell presently undergoing normal (or fast) programming, a second voltage (e.g., a medium voltage) is applied to bit lines associated with NAND strings having a memory cell presently undergoing slow programming, and a third voltage (e.g., a high voltage) is applied to bit lines associated with NAND strings having a memory cell presently inhibited from or locked out from further programming. In one embodiment, the magnitude of the first voltage depends on the location of the selected word line along the NAND string. In one embodiment, the magnitude of the second voltage depends on the location of the selected word line along the NAND string. In one embodiment, the magnitude of the third voltage depends on the location of the selected word line along the NAND string.

Step 820 may also include applying an appropriate voltage to a common source line. In one embodiment, the magnitude of the voltage to a common source line depends on the location of the selected word line along the NAND string. Note that the common source line may be in electrical contact with diffusion regions 431 of SGS transistors 406. Thus, in one embodiment, the magnitude of the voltage applied to the (source) diffusion region 431 of an SGS transistor 406 depends on the location of the selected word line along the NAND string.

Step 820 may also include applying an appropriate voltage to a gate of a select gate of a NAND string. Stated another way, step 820 may include applying an appropriate voltage to select line of a NAND string. The select gate may be for either a SGS transistor 406 or a SGD transistor 424. Thus, the select line may be either a source side select line (e.g., SGS) or a drain side select line (e.g., SGD). In one embodiment, the magnitude of the voltage to the gate of a select transistor of a NAND string depends on the location of the selected word line along the NAND string. In other words, the magnitude of the voltage to a select line (SGS and/or SGG) of a NAND string depends on the location of the selected word line along the NAND string.

Applying the program conditions in step 820 may also include applying a pass voltage to unselected word lines. The magnitude of the pass voltage for each unselected word line may depend on which boosting scheme is being used. A variety of boosting schemes including, but not limited to, self-boosting (SB), local self-boosting (LSB), and erase area self-boosting (EASB) may be used. As is known to those of ordinary skill in the art, the magnitude of the pass voltage may be different for different unselected word lines. Also, the magnitude of the pass voltage for a given unselected word line may depend on the relative location of that unselected word line to the word line that is selected for programming. The pass voltage may help to reduce program disturb by boosting the voltage of the channel below the memory cell. Applying programming conditions that depend on the location of the selected word line may prevent or reduce leakage of the boosted channel potential. Therefore, program disturb may be prevented or reduced.

In step 822, a verification process is performed. In one embodiment, the verification is a concurrent coarse/fine verify. Referring to FIG. 7A, as one example, some memory cells that are being programmed to the A-state are verified using the VvaL level, and others that are being programmed to the A-state are verified using the Vva level. During the initial programming steps in which the memory cell's threshold is well below the final level (Vva), course programming may be applied. However, after the memory cell's threshold voltage reaches VvaL, fine programming may be used. Thus, some memory cells are verified for coarse programming, whereas other memory cells are verified for fine programming. Note that when a particular memory cell has been verified as being programmed to its intended state, it may be locked out from further programming. Note that using coarse/fine programming is not required. In one embodiment, the intermediate verify levels (e.g., VvaL, VvbL, etc.) are not used.

In step 824, it is determined whether all or almost all of the memory cells have verified that their threshold voltages are at the final target voltage for that memory cell. If so, the programming process is completed successfully (status=pass) in step 826. If all or almost all of the memory cells are not verified to have reached their final target levels, then it is determined whether the program counter (PC) is less than a maximum value such as 20. If the program counter (PC) is not less than max (step 828), then the program process has failed (step 830). If the program counter (PC) is less than a maximum value (e.g., 20), then the program counter (PC) is incremented by one and the program voltage is stepped up to the next pulse in step 832. Subsequent to step 832, the process loops back to step 820 and the next program pulse is applied to the memory cells.

FIG. 9 is a timing diagram illustrating voltages during program operations, according to one embodiment. The timing diagram depicts one embodiment of programming conditions that are applied during step 820 of process 800. In various embodiments, one or more of the programming conditions depends on the location of the selected word line. In some embodiments, the magnitude of a voltage depends on the location of the selected word line. In one embodiment, the duration of the program voltage depends on the location of the selected word line.

The voltages shown are applied to various select lines, word lines, bit lines, and the common source line of the memory array, for NAND strings under fast programming, slow programming, and program inhibition. The program operation can be grouped into a Bit Lines Precharge Phase, a Program Phase and a Discharge Phase.

Bit Lines Precharge Phase: During phase (1), the SGS transistors 406 are turned off by SGS being at Vsgs (voltage waveform (A) in FIG. 9) while the SGD transistors 424 are turned on by SGD going high to Vsg (voltage waveform (B) in FIG. 9), thereby allowing a bit line to access a NAND string. In one embodiment, the magnitude of Vsgs depends on the location of the selected word line. In one embodiment, the magnitude of Vsgs is higher when lower word lines are being programmed to prevent or reduce GIDL. In one embodiment, the magnitude of Vsgs is negative when middle word lines or higher word lines are being programmed to prevent or reduce program disturb associated with DIBL.

During phase (2), the bit line voltage of a program-inhibited NAND string is allowed to rise to a predetermined voltage given by VBL_inhibit (voltage waveform (E) in FIG. 9). When the bit line voltage of the program-inhibited NAND string rises to VBL_inhibit, the program-inhibited NAND string will float when the gate voltage on the SGD transistor 424 drops to V_SGD. In one embodiment, the voltage VBL_inhibit depends on which word line is selected for programming.

At the same time, the bit line voltage of a programming NAND string is either pulled down to VBL_Select or maintained at VBL_Select if already there (voltage waveform (G) in FIG. 9). In one embodiment, the voltage VBL_Select depends on which word line is selected for programming.

Also during phase (2), the bit line voltage of NAND strings that are undergoing slow programming is set to an intermediate voltage given by VBL_QPW (voltage waveform (F) in FIG. 9). The voltage VBL_QPW is between VBL_Select and VBL_inhibit. The voltage VBL_QPW allows the selected memory cell to program, but at a slower rate than if VBL_Select were used. In one embodiment, the voltage VBL_QPW depends on which word line is selected for programming.

Also during phase (2), the voltage on the common source line is set to voltage given by V_Cell_Source (voltage waveform (H) in FIG. 9). In one embodiment, the voltage V_Cell_Source depends on which word line is selected for programming.

During phase (3), the drain select line (SGD) connecting to the SGD transistors 424 of NAND strings has its voltage lowered to V_SGD. In one embodiment, this will float only those program-inhibited NAND strings where their bit line voltage is comparable to V_SGD, since their SGD transistors 424 are turned off (voltage waveforms (B) and (E) in FIG. 9). As for the NAND strings containing a memory cell to be programmed, their SGD transistors 424 will not be turned off relative to the bit line voltage (e.g., near 0V) at their drain. In one embodiment, the voltage V_SGD depends on which word line is selected for programming. In one embodiment, the voltage V_SGD depends on the location of the selected word line in order to prevent or eliminate effects of DIBL. For example, the SGD transistors 424 of unselected NAND strings may be kept off despite their Vth being lowered by DIBL. In one embodiment, the magnitude of V_SGD is lower for higher selected word lines, which may keep the SGD transistors 424 turned off despite possible DIBL.

In one embodiment, the magnitude of V_SGD depends on the location of the selected word line in order to prevent or eliminate effects of GIDL. For example, the magnitude of V_SGD may be higher when the selected word line is near the SGD transistors 424 (relative to when the selected word line is a middle word line, for example). This increase in V_SGD may prevent leakage of charge from the boosted channel due to GIDL.

During phase (4), the memory cells in a NAND string not being programmed have their control gate voltage set to VPASS (voltage waveform (C) in FIG. 9). Also, the memory cell being programmed may have its control gate voltage set to VPASS (voltage waveform (D) in FIG. 9). Since a program-inhibited NAND string is floating, the VPASS applied to the control gates of the memory cells boosts up the voltages of their channels. For the sake of discussion, the entire NAND string may be considered to have a channel. Thus, it may be stated that VPASS boosts the channel voltage of the NAND string. VPASS may be set to some intermediate voltage (e.g., ~10V) relative to Vpgm (e.g., ~15-24V). Depending on the boosting scheme being used, the value of VPASS is not required to be the same for each unselected word line.

Program Phase: During phase (5), a programming voltage Vpgm is applied to the control gate of a memory cell selected for programming (voltage waveform (D) in FIG. 9). This may be achieved by applying Vpgm to the selected word line. The memory cells under program inhibition (e.g., with boosted channels) will not be programmed. The memory cells under programming will be programmed. Note that Vpgm may also contribute to channel boosting. Applying program conditions that depend on which word line is selected may prevent or substantially reduce the boosted channel voltage from reducing during the program phase.

In one embodiment, the duration of the program pulse (e.g., duration of phase 5) depends on the location of the selected word line. This may help to reduce or eliminate program disturb.

In the Discharge Phase: During phase (6), the various control lines and bit lines are allowed to discharge.

Any combination of the selected word line dependent signals discussed in connection with FIG. 9 may be used together when programming non-volatile storage.

Figure 10:
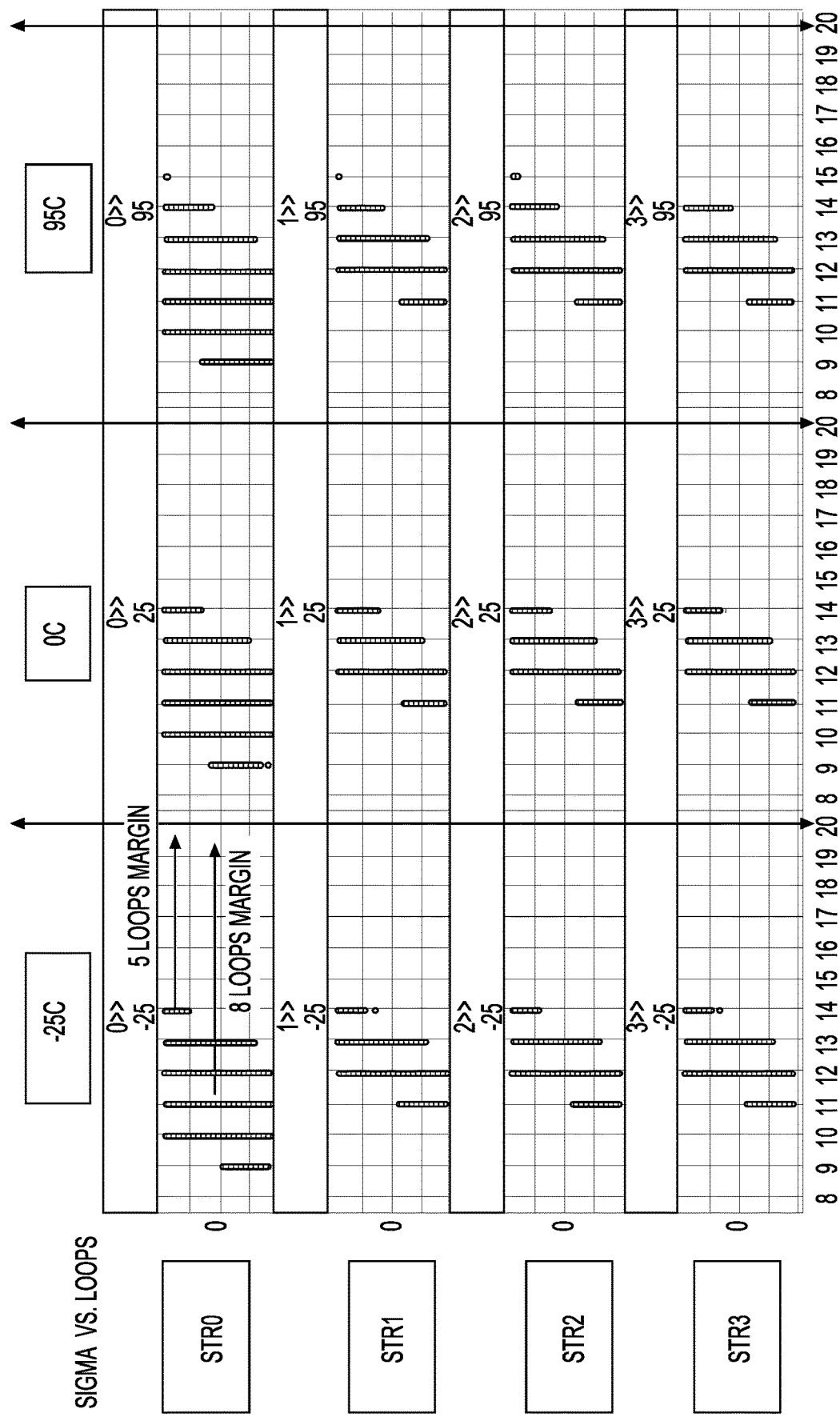
FIG. 10 shows plots of sigma program loops for each string of the memory apparatus over various temperatures for the example memory apparatus according to aspects of the disclosure.

As discussed above, a maximum number of program loops may be used to determine whether the program operation for the memory cells being programmed is considered to have failed is utilized. Currently, such a maximum number of program loops or maximum allowable quantity NLP_U is a fixed parameter chosen ahead of time for the memory apparatus (i.e., it is the same for all wafers, dies, blocks, word lines, and strings). So, even though the number of program loops is strongly correlated with cell properties like program speed, natural threshold voltage Vt (NVT), etc, the maximum allowable quantity NLP_U is typically fixed. In order to take care of program speed variation, such that program status does not cause yield loss, the maximum allowable quantity NLP_U is commonly set too conservatively. In one example memory apparatus, the typical number of loops necessary for a program operation is approximately 13, while the maximum allowable quantity NLP_U is 20 loops (i.e., 7-8 loops of program loops margin for typical word lines). This is illustrated in FIG. 10, which shows sigma program loops for each string of the memory apparatus over various temperatures for the example memory apparatus. As shown, the maximum allowable quantity NLP_U is too relaxed even for worst measured word line (which takes 15 loops from the beginning of the program operation). As mentioned above, the reason for such a relaxed maximum allowable quantity NLP_U is to account for wafer to wafer variation that can result in ~3 loops variation. Setting the maximum allowable quantity NLP_U too tight typically results in significant yield loss.

Figure 11:
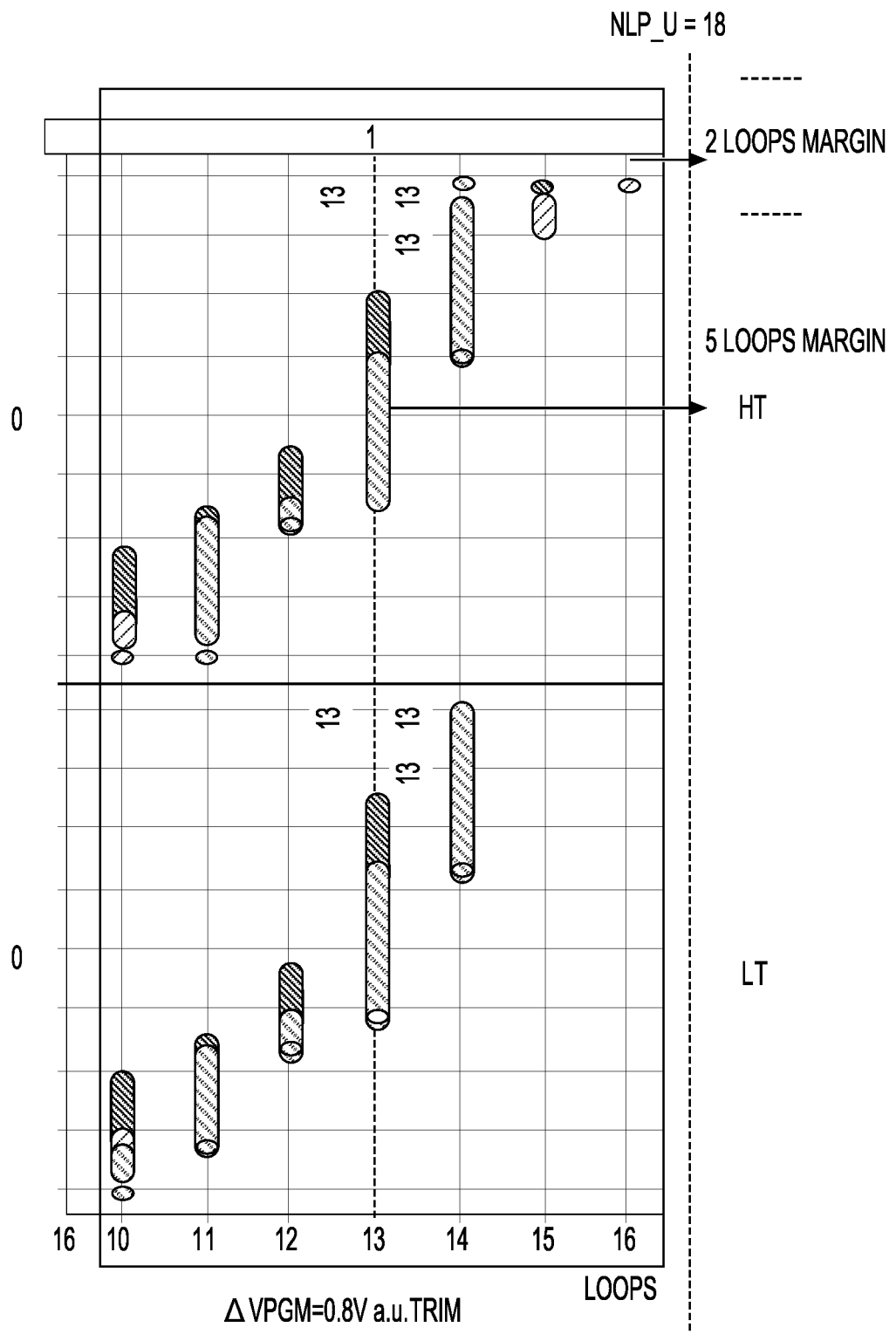
FIG. 11 shows another plot of sigma program loops for each string of the memory apparatus at a high temperature and at a low temperature according to aspects of the disclosure.

FIG. 11 shows another plot of sigma program loops for each string of the memory apparatus at a high temperature and at a low temperature. The program voltage step size DVPGM or DVPGM_U used in the program operation of the memory apparatus is 0.8 volts and the maximum allowable quantity NLP_U is 18. The example memory apparatus defines the maximum allowable quantity NLP_U from the first program loop (i.e., when A-state starts verify for a memory apparatus storing three bits per memory cell). In this implementation, the maximum allowable quantity NLP_U is not based on natural threshold voltage Vt and program speed variations that impacts loops. With memory apparatuses utilizing smart verify (SV), at least the first program loop is decided by memory cells that are fast or quicker to program. However, the overall number of program loops is ultimately determined by memory cells that are slow to program, and hence, any memory cell information gathered as part of the smart verify is not sufficient to guarantee the same margin from typical loops to the maximum allowable quantity NLP_U setting. This results in different program loops margin for word lines, blocks, dies as shown in FIG. 11.

As shown, the worst number measured program loops is 16. This die/block/word line has 2 loops margin. The typical number of measured program loops is 13. This means typical die/block/word line has 5 loops margin translating to 4.0 volt (i.e., 5*0.8 volts=4.0 volts margin). Due to a defect on one of these typical word lines, the word line is allowed to take up to 5 loops before failing status. Similarly, referring back to FIG. 10, due to such a relaxed maximum allowable quantity NLP_U, any defective word line that causes the memory operation to be slow is allowed to take as many as approximately 7 more program loops if it happens to be on typical word line. This means there is a substantial program disturb risk due to high program voltage VPGM before failing. So, allowing 5-7 additional program loops before failing due to a relaxed maximum allowable quantity NLP_U can cause significant reliability risks and potentially allows program disturb to happen before the program operation fails. If the maximum allowable quantity NLP_U is tightened or reduced, yield may be reduced as dies that are slower will fail even though reliability is acceptable.

Figure 12:
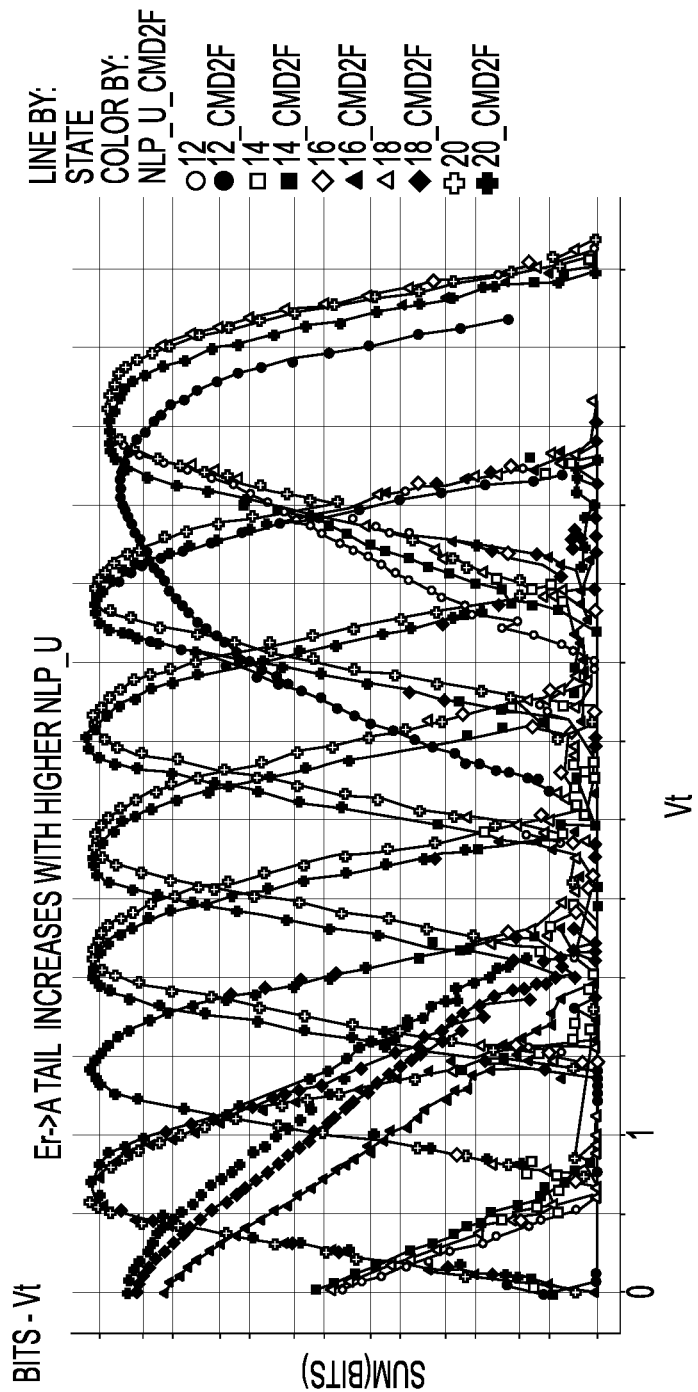
FIG. 12 shows a plot of quantities of memory cells versus threshold voltage for an example memory apparatus showing significant program disturb according to aspects of the disclosure.

The program disturb risk due to high program voltage VPGM before the program operation fails is confirmed by checking program disturb with a particular program command of the memory apparatus, CMD 2F which forces the program operation to continue until the maximum allowable quantity NLP_U is reached. From the data shown in FIG. 12, on an example memory apparatus, significant program disturb is evident, even with 16 program loops with CMD 2F (i.e., just 1 more than worst word line). This means there is no margin for program disturb if a word line takes approximately 16 or more loops due to some defect on a word line, which is usually considered typical. Hence, the concept of having a fixed, relaxed maximum allowable quantity NLP_U to take care of all program speed variation across wafer, die, blocks, word lines, and strings is allowing potential weak defects to pass status easily while causing huge program disturb and hence uncorrectable by ECC (UECC).

FIGS. 13 and 14 show a comparison of a dynamic maximum allowable quantity (NLP_U) versus a fixed maximum allowable quantity NPL_U. Specifically, FIG. 13 shows the fixed maximum allowable quantity NLP_U. As shown, the maximum allowable quantity NLP_U is defined from the first program loop. As discussed above, in such an implementation, the maximum allowable quantity NLP_U is not based on program speed variations that impact final program loops. Even though the first loop may be decided by fast to program memory cells on most word lines and strings using smart verify, however, the number or quantity of final program loops is determined by slow to program memory cells. To account for all possible variations, the maximum allowable quantity NLP_U is kept too relaxed in order to reduce yield loss. Yet this results in allowing weak defects to pass program status easily, while causing uncorrectable ECC errors due to high program disturb (i.e., defect parts per million (dppm) events).

In contrast, as shown in FIG. 14, the maximum allowable quantity NLP_U can instead be defined or varied based on the program loop when A-state finish verify (i.e., NLP_U_new). Consequently, the maximum allowable quantity NLP_U is a function of program speed, NVT, etc. Hence, the main cause of variation between wafers, dies, blocks, word lines, and strings is already accounted by defining the maximum allowable quantity NLP_U from the program loop when the A-state finishes verify. For example, if the maximum allowable quantity NLP_U is equal to 9, the maximum number of program loops allowed is 9 from when A-state finishes verify.

In addition, it can be shown that a quantity or number of final program loops are linearly correlated to the quantity or number of program loops when A-state finishes verify. This is shown in FIG. 15 which shows the quantity or number of final loops is high if the quantity or number of program loops to finish A-verify is high and the quantity or number of final loops is reduced if the quantity or number of program loops to finish A-verify are reduced. Specifically, as shown, there is a linear correlation between final loops as compared to when A-state verify finishes. The typical quantity or number of program loops is approximately 12 and A-state verify finishes after approximately 4 program loops. If the A-state verify finishes early (e.g., at or after 2 program loops), the quantity of final loops is also reduced by 2 (i.e., approximately 10 program loops). If the A-state verify finishes late (e.g., at or after 6 loops), the quantity of final loops also increases by 2 (i.e., approximately 14 program loops). This is true across temperatures.

The observation that final program loops are linearly correlated to the quantity of program loops when the A-verify finishes is expected since NVT width is usually similar irrespective of threshold voltage Vt being low or high (slight increase for higher threshold voltages Vts may be due to word line RC time constant (WLRC) increases, but is usually less than the program voltage step size DVPGM). Further, memory cells achieve steady state by the time the A-state finishes verify, and hence, the quantity of program loops to reach higher states is predictable. This means that the quantity of program loops needed to finish G-verify from A-verify is predictable, as summarized in the table of FIG. 16.

Consequently, described herein is a memory apparatus (e.g., memory device 210 of FIG. 4) including memory cells (e.g., storage elements 324, 344 and 364 of FIG. 2) connected to one of a plurality of word lines (e.g., WL3, WL2, WL1, WL0 of FIG. 2). The memory cells are arranged in one or more strings (e.g., NAND strings 320, 340 and 360 of FIG. 2) and configured to retain a threshold voltage Vt or Vth corresponding to one of a plurality of memory states (e.g., Erase, A, B, C, D, E, F and G in FIG. 6A). The apparatus also includes a control circuit (e.g., one or any combination of control circuitry 220, power control circuit 226, decoder circuit 224, state machine circuit 222, decoder circuit 242A, decoder circuit 242B, decoder circuit 240A, decoder circuit 240B, read/write circuits 230A, read/write circuits 230B, and/or controller 244 of FIG. 4) coupled to the plurality of word lines and the one or more strings. The control circuit is configured to program the memory cells to reach one of a plurality of verify levels (e.g., VvA, VvB, VvC, VvD, VvE, VvF, VvG of FIG. 6A) each corresponding to one of the plurality of memory states using a series of voltage pulses applied to each of the plurality of word lines during a program operation. The control circuit is also configured to determine a first intermediate quantity of the series of voltage pulses necessary for a first plurality of memory cells associated with a selected one of the plurality of memory states to reach the one of the plurality of verify levels corresponding to the selected one of the plurality of memory states. In addition, the control circuit is configured to end the program operation after a maximum allowable quantity NLP_U of the series of voltage pulses are utilized. The maximum allowable quantity NLP_U is selected based on the first intermediate quantity. So, the memory apparatus disclosed herein dynamically defines the maximum allowable quantity NLP_U, which will ensure similar program loops margin across all wafers, dies, blocks, word lines, and strings.

As discussed above, the threshold voltage Vt possible for each of the memory cells spans a threshold window partitioned into a plurality of regions for the plurality of memory states demarcated by the plurality of verify levels. The plurality of memory states includes an erased state corresponding to the threshold voltage Vt being lower compared to a plurality of programmed states including, in order of the threshold voltage Vt increasing in magnitude, a first data state and a plurality of successive programmed states and the selected one of the plurality of memory states is the first data state. In more detail, if each of the memory cells is configured to store three bits, the first data state is the A-state and the plurality of successive programmed states includes, in order of the threshold voltage Vt increasing in magnitude, a B-state, a C-state, a D-state, an E-state, an F-state, and a G-state (see e.g., FIG. 6A). So, according to an aspect, the selected one of the plurality of memory states is the A-state. Therefore, the first intermediate quantity is the number of voltage pulses (i.e., program loops) necessary for the memory cells associated with the A-state to reach the verify level for the A-state. Alternatively, the selected one of the plurality of memory states could instead be one of the plurality of successive programmed states (e.g., the B-state, C-state, D-state, E-state, F-state, or G-state).

According to an aspect, the control circuit is further configured to select the maximum allowable quantity NLP_U as a sum of a predetermined loop quantity and the first intermediate quantity. So, for example, if the selected one of the plurality of memory states is the A-state (i.e., the first intermediate quantity) and the predetermined loop quantity is 11, and the A-state finishes verify at the second program loop, the maximum allowable quantity NLP_U is the predetermined loop quantity, 11 added to the first intermediate quantity, 2. Thus, the program operation must finish by the thirteenth program loop (i.e., 11 program loops after the A-state finishes verify).

As highlighted in the last column of the table of FIG. 16, the difference between the quantity or number of the final loops and the quantity of program loops when the A-state verify finishes is 8 or 9 (approximately 1 loop variation) for almost all word lines, strings, dies, blocks measured. This means the same margin from the maximum allowable quantity NLP_U for all word lines, strings, dies, blocks can be defined. Referring back to FIG. 14, the maximum allowable quantity NLP_U is defined as 9, which will provide approximately 3 loops margin irrespective of the final program loops. Thus, the control circuit is further configured to determine a second intermediate quantity of the series of voltage pulses necessary for a second plurality of memory cells associated with another selected one of the plurality of memory states to reach the one of the plurality of verify levels corresponding to the another selected one of the plurality of memory states (i.e., the final loops or the number of program loops it takes for the last of the programmed states to finish verify). The control circuit is also configured to select the maximum allowable quantity NLP_U to provide a predetermined margin quantity of the series of voltage pulses between the maximum allowable quantity NLP_U and the second intermediate quantity (i.e., the final loops). So, for example, as shown in FIG. 14, the maximum allowable quantity NLP_U is selected to provide a predetermined margin quantity of the series of voltage pulses between the maximum allowable quantity NLP_U and the second intermediate quantity (i.e., the final loops) of 3.

While the maximum allowable quantity NLP_U can be dynamically defined (e.g., program lops after the A-state finishes verify), it may be desirable to continue to have fixed limit of program loops or predetermined ultimate maximum allowable quantity (e.g., 18) defined from the first program loop to take care of cases when A-state takes abnormally high loops to finish. Therefore, the control circuit is further configured to end the program operation after a predetermined ultimate maximum allowable quantity of the series of voltage pulses are utilized. The predetermined ultimate maximum allowable quantity is greater than the maximum allowable quantity NLP_U and not selected based on the first intermediate quantity (e.g., not based on when the A-state finishes verify).

Referring now to FIG. 17, a method of operating a memory apparatus is also provided. As discussed above, the memory apparatus (e.g., memory device 210 of FIG. 4) includes memory cells (e.g., storage elements 324, 344 and 364 of FIG. 2) connected to one of a plurality of word lines (e.g., WL3, WL2, WL1, WL0 of FIG. 2). The memory cells are arranged in one or more strings (e.g., NAND strings 320, 340 and 360 of FIG. 2) and configured to retain a threshold voltage Vt or Vth corresponding to one of a plurality of memory states (e.g., Erase, A, B, C, D, E, F and G in FIG. 6A). The method includes the step of 1000 programming the memory cells to reach one of a plurality of verify levels (e.g., VvA, VvB, VvC, VvD, VvE, VvF, VvG of FIG. 6A) each corresponding to one of the plurality of memory states using a series of voltage pulses applied to each of the plurality of word lines during a program operation. The method continues with the step of 1002 determining a first intermediate quantity of the series of voltage pulses necessary for a first plurality of memory cells associated with a selected one of the plurality of memory states to reach the one of the plurality of verify levels corresponding to the selected one of the plurality of memory states. The method also includes the step of 1004 ending the program operation after a maximum allowable quantity NLP_U of the series of voltage pulses are utilized, the maximum allowable quantity NLP_U selected based on the first intermediate quantity.

Again, the threshold voltage Vt possible for each of the memory cells spans the threshold window partitioned into the plurality of regions for the plurality of memory states demarcated by the plurality of verify levels. The plurality of memory states includes the erased state corresponding to the threshold voltage Vt being lower compared to the plurality of programmed states including, in order of the threshold voltage Vt increasing in magnitude, the first data state and the plurality of successive programmed states and the selected one of the plurality of memory states is the first data state. If each of the memory cells is configured to store three bits and the first data state is an A-state and the plurality of successive programmed states includes, in order of the threshold voltage Vt increasing in magnitude, a B-state, a C-state, a D-state, an E-state, an F-state, and a G-state. So, according to an aspect, the selected one of the plurality of memory states is the A-state. Alternatively, the selected one of the plurality of memory states is one of the plurality of successive programmed states (e.g., the B-state, C-state, D-state, E-state, F-state, or G-state).

According to an aspect, the method further includes the step of selecting the maximum allowable quantity NLP_U as a sum of a predetermined loop quantity and the first intermediate quantity. So, as discussed above, if the selected one of the plurality of memory states is the A-state (i.e., the first intermediate quantity), for example, and the predetermined loop quantity is 11, and the A-state finishes verify at the second program loop, the maximum allowable quantity NLP_U is 13 (i.e., the predetermined loop quantity, 11 added to the first intermediate quantity, 2).

The method can also include the step of determining a second intermediate quantity of the series of voltage pulses necessary for a second plurality of memory cells associated with another selected one of the plurality of memory states to reach the one of the plurality of verify levels corresponding to the another selected one of the plurality of memory states (i.e., the final loops or the number of program loops it takes for the last of the programmed states to finish verify). The method can also include the step of selecting the maximum allowable quantity NLP_U to provide a predetermined margin quantity of the series of voltage pulses between the maximum allowable quantity NLP_U and the second intermediate quantity (i.e., the final loops).

As discussed above, it may be desirable to continue to have fixed limit of program loops or predetermined ultimate maximum allowable quantity (e.g., 18) defined from the first program loop to take care of cases when A-state takes abnormally high loops to finish. Thus, the method further includes the step of ending the program operation after a predetermined ultimate maximum allowable quantity of the series of voltage pulses are utilized (e.g., 18). The predetermined ultimate maximum allowable quantity is greater than the maximum allowable quantity NLP_U and not selected based on the first intermediate quantity.

The advantages of the memory apparatus and method disclosed herein include the memory apparatus providing the same max program loop margin or predetermined margin quantity across all word lines, strings, blocks, dies, and wafers, thereby making sure weak defects fail status without causing program disturb risk. Furthermore, the memory apparatus and method disclosed herein can reduce the chance of allowing potential weak defects passing status easily and causing huge program disturb and hence uncorrectable by ECC (i.e., dppm issues). In other words, good trade-off is provided between yield and dppm issues. In addition, a program loop guard-band (i.e., margin) is provided while not having to keep the maximum allowable quantity NLP_U too relaxed, as done in some known memory apparatuses.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

What is claimed is:

1. A memory apparatus, comprising:
    memory cells connected to one of a plurality of word lines and arranged in one or more strings and configured to retain a threshold voltage corresponding to one of a plurality of memory states; and
    a control circuit coupled to the plurality of word lines and the one or more strings and configured to:
        program the memory cells to reach one of a plurality of verify levels each corresponding to one of the plurality of memory states using a series of voltage pulses applied to each of the plurality of word lines during a program operation,
        determine a first intermediate quantity of the series of voltage pulses necessary for a first plurality of memory cells associated with a selected one of the plurality of memory states to reach the one of the plurality of verify levels corresponding to the selected one of the plurality of memory states, and
        end the program operation after a maximum allowable quantity of the series of voltage pulses are utilized, the maximum allowable quantity selected based on the first intermediate quantity.

2. The memory apparatus as set forth in claim 1, wherein the control circuit is further configured to select the maximum allowable quantity as a sum of a predetermined loop quantity and the first intermediate quantity.

3. The memory apparatus as set forth in claim 1, wherein the threshold voltage possible for each of the memory cells spans a threshold window partitioned into a plurality of regions for the plurality of memory states demarcated by the plurality of verify levels, the plurality of memory states includes an erased state corresponding to the threshold voltage being lower compared to a plurality of programmed states including, in order of the threshold voltage increasing in magnitude, a first data state and a plurality of successive programmed states and the selected one of the plurality of memory states is the first data state.

4. The memory apparatus as set forth in claim 3, wherein each of the memory cells is configured to store three bits and the first data state is an A-state and the plurality of successive programmed states includes, in order of the threshold voltage increasing in magnitude, a B-state, a C-state, a D-state, an E-state, an F-state, and a G-state and the selected one of the plurality of memory states is the A-state.

5. The memory apparatus as set forth in claim 3, wherein the selected one of the plurality of memory states is one of the plurality of successive programmed states.

6. The memory apparatus as set forth in claim 3, wherein the control circuit is further configured to:
    determine a second intermediate quantity of the series of voltage pulses necessary for a second plurality of memory cells associated with another selected one of the plurality of memory states to reach the one of the plurality of verify levels corresponding to the another selected one of the plurality of memory states; and
    select the maximum allowable quantity to provide a predetermined margin quantity of the series of voltage pulses between the maximum allowable quantity and the second intermediate quantity.

7. The memory apparatus as set forth in claim 1, wherein the control circuit is further configured to end the program operation after a predetermined ultimate maximum allowable quantity of the series of voltage pulses are utilized, the predetermined ultimate maximum allowable quantity being greater than the maximum allowable quantity and not selected based on the first intermediate quantity.

8. A controller in communication with a memory apparatus including memory cells connected to one of a plurality of word lines and arranged in one or more strings and configured to retain a threshold voltage corresponding to one of a plurality of memory states, the controller configured to:
    instruct the memory apparatus to program the memory cells to reach one of a plurality of verify levels each corresponding to one of the plurality of memory states using a series of voltage pulses applied to each of the plurality of word lines during a program operation;

determine a first intermediate quantity of the series of voltage pulses necessary for a first plurality of memory cells associated with a selected one of the plurality of memory states to reach the one of the plurality of verify levels corresponding to the selected one of the plurality of memory states; and instruct the memory apparatus to end the program operation after a maximum allowable quantity of the series of voltage pulses are utilized, the maximum allowable quantity selected based on the first intermediate quantity.

9. The controller as set forth in claim 8, wherein the controller is further configured to select the maximum allowable quantity as a sum of a predetermined loop quantity and the first intermediate quantity.

10. The controller as set forth in claim 8, wherein the threshold voltage possible for each of the memory cells spans a threshold window partitioned into a plurality of regions for the plurality of memory states demarcated by the plurality of verify levels, the plurality of memory states includes an erased state corresponding to the threshold voltage being lower compared to a plurality of programmed states including, in order of the threshold voltage increasing in magnitude, a first data state and a plurality of successive programmed states and the selected one of the plurality of memory states is the first data state.

11. The controller as set forth in claim 10, wherein the selected one of the plurality of memory states is one of the plurality of successive programmed states.

12. The controller as set forth in claim 10, wherein the controller is further configured to:

determine a second intermediate quantity of the series of voltage pulses necessary for a second plurality of memory cells associated with another selected one of the plurality of memory states to reach the one of the plurality of verify levels corresponding to the another selected one of the plurality of memory states; and select the maximum allowable quantity to provide a predetermined margin quantity of the series of voltage pulses between the maximum allowable quantity and the second intermediate quantity.

13. The controller as set forth in claim 8, wherein the controller is further configured to instruct the memory apparatus to end the program operation after a predetermined ultimate maximum allowable quantity of the series of voltage pulses are utilized, the predetermined ultimate maximum allowable quantity being greater than the maximum allowable quantity and not selected based on the first intermediate quantity.

14. A method of operating a memory apparatus including memory cells connected to one of a plurality of word lines and arranged in one or more strings and configured to retain a threshold voltage corresponding to one of a plurality of memory states, the method comprising the steps of:

programming the memory cells to reach one of a plurality of verify levels each corresponding to one of the plurality of memory states using a series of voltage pulses applied to each of the plurality of word lines during a program operation;

determining a first intermediate quantity of the series of voltage pulses necessary for a first plurality of memory cells associated with a selected one of the plurality of memory states to reach the one of the plurality of verify levels corresponding to the selected one of the plurality of memory states; and ending the program operation after a maximum allowable quantity of the series of voltage pulses are utilized, the maximum allowable quantity selected based on the first intermediate quantity.

15. The method as set forth in claim 14, further including the step of selecting the maximum allowable quantity as a sum of a predetermined loop quantity and the first intermediate quantity.

16. The method as set forth in claim 14, wherein the threshold voltage possible for each of the memory cells spans a threshold window partitioned into a plurality of regions for the plurality of memory states demarcated by the plurality of verify levels, the plurality of memory states includes an erased state corresponding to the threshold voltage being lower compared to a plurality of programmed states including, in order of the threshold voltage increasing in magnitude, a first data state and a plurality of successive programmed states and the selected one of the plurality of memory states is the first data state.

17. The method as set forth in claim 16, wherein each of the memory cells is configured to store three bits and the first data state is an A-state and the plurality of successive programmed states includes, in order of the threshold voltage increasing in magnitude, a B-state, a C-state, a D-state, an E-state, an F-state, and a G-state and the selected one of the plurality of memory states is the A-state.

18. The method as set forth in claim 16, wherein the selected one of the plurality of memory states is one of the plurality of successive programmed states.

19. The method as set forth in claim 16, further including the steps of:

determining a second intermediate quantity of the series of voltage pulses necessary for a second plurality of memory cells associated with another selected one of the plurality of memory states to reach the one of the plurality of verify levels corresponding to the another selected one of the plurality of memory states; and selecting the maximum allowable quantity to provide a predetermined margin quantity of the series of voltage pulses between the maximum allowable quantity and the second intermediate quantity.

20. The method as set forth in claim 14, further including the step of ending the program operation after a predetermined ultimate maximum allowable quantity of the series of voltage pulses are utilized, the predetermined ultimate maximum allowable quantity being greater than the maximum allowable quantity and not selected based on the first intermediate quantity.

* * * * *